(12) United States Patent
Curhan et al.

(10) Patent No.: US 11,691,297 B2
(45) Date of Patent: *Jul. 4, 2023

(54) FIELD-ASSEMBLED SOFT GRIPPING FOR INDUSTRIAL AND COLLABORATIVE ROBOTS

(71) Applicant: SOFT ROBOTICS, INC., Bedford, MA (US)

(72) Inventors: Jeffrey Curhan, Warwick, RI (US); Chikyung Won, Tewksbury, MA (US); Andrew George Goodale, Boston, MA (US)

(73) Assignee: SOFT ROBOTICS, INC., Bedford, MA (US)

( * ) Notice: Subject to any disclaimer, the term of this patent is extended or adjusted under 35 U.S.C. 154(b) by 46 days.

This patent is subject to a terminal disclaimer.

(21) Appl. No.: 17/403,325

(22) Filed: Aug. 16, 2021

(65) Prior Publication Data
US 2021/0370527 A1 Dec. 2, 2021

Related U.S. Application Data

(63) Continuation of application No. 16/366,374, filed on Mar. 27, 2019, now Pat. No. 11,090,818.

(Continued)

(51) Int. Cl.
*B25J 15/12* (2006.01)
*B25J 15/10* (2006.01)
(Continued)

(52) U.S. Cl.
CPC ............. *B25J 15/12* (2013.01); *B25J 9/142* (2013.01); *B25J 15/0023* (2013.01);
(Continued)

(58) Field of Classification Search
CPC .... B25J 15/12; B25J 15/0023; B25J 15/0253; B25J 15/10; B25J 9/142; B25J 19/0075
See application file for complete search history.

(56) References Cited

U.S. PATENT DOCUMENTS 3,343,864 A * 9/1967 Baer ................... B25J 15/12
                                                          92/92
6,484,601 B1 * 11/2002 Arrichiello .......... B25J 15/0206
                                                          92/37

(Continued)

OTHER PUBLICATIONS

Automation Insights—We Share Our Passion for Automation. Datasheet. [online] Baluff, Inc., Mar. 7, 2018 [retrieved an Nov. 12, 2021]. Retrieved from Internet URL: https://automation-insights.blog/2018/03/07/, 6 pages.

(Continued)

*Primary Examiner* — Stephen A Vu
(74) *Attorney, Agent, or Firm* — Goodwin Procter LLP

(57) ABSTRACT

A soft robotic gripper having component parts capable of being assembled in the field at the terminus of an industrial robot arm for providing adaptive gripping of a product. A hub includes a pneumatic inlet leading to outlets. Finger mounts with pneumatic passages hold inflatable fingers, and tension fastener(s) secure and compress the finger mounts toward the hub by passing through the pneumatic passages and fastening under tension in a direction of the hub.

20 Claims, 32 Drawing Sheets

Related U.S. Application Data

(60) Provisional application No. 62/795,892, filed on Jan. 23, 2019, provisional application No. 62/664,765, filed on Apr. 30, 2018, provisional application No. 62/648,597, filed on Mar. 27, 2018.

(51) Int. Cl.
  *B25J 15/02* (2006.01)
  *B25J 19/00* (2006.01)
  *B25J 15/00* (2006.01)
  *B25J 9/14* (2006.01)

(52) U.S. Cl.
  CPC .......... *B25J 15/0253* (2013.01); *B25J 15/10* (2013.01); *B25J 19/0075* (2013.01)

(56) References Cited

U.S. PATENT DOCUMENTS

| | | | |
|---|---|---|---|
| 7,258,379 B2 * | 8/2007 | Ono | B25J 9/142 |
| | | | 294/119.3 |
| 7,370,896 B2 * | 5/2008 | Anderson | B25J 15/08 |
| | | | 901/39 |
| 9,797,415 B2 | 10/2017 | Martinez et al. | |
| 11,090,818 B2 * | 8/2021 | Curhan | B25J 15/10 |
| 2003/0110938 A1 * | 6/2003 | Seto | B25J 15/12 |
| | | | 92/92 |

OTHER PUBLICATIONS

Sanitary Equipment Design Principles Checklist & Glossary, Foundation for Meat & Poultry Research Education, Jan. 2014, 20 pages.

\* cited by examiner

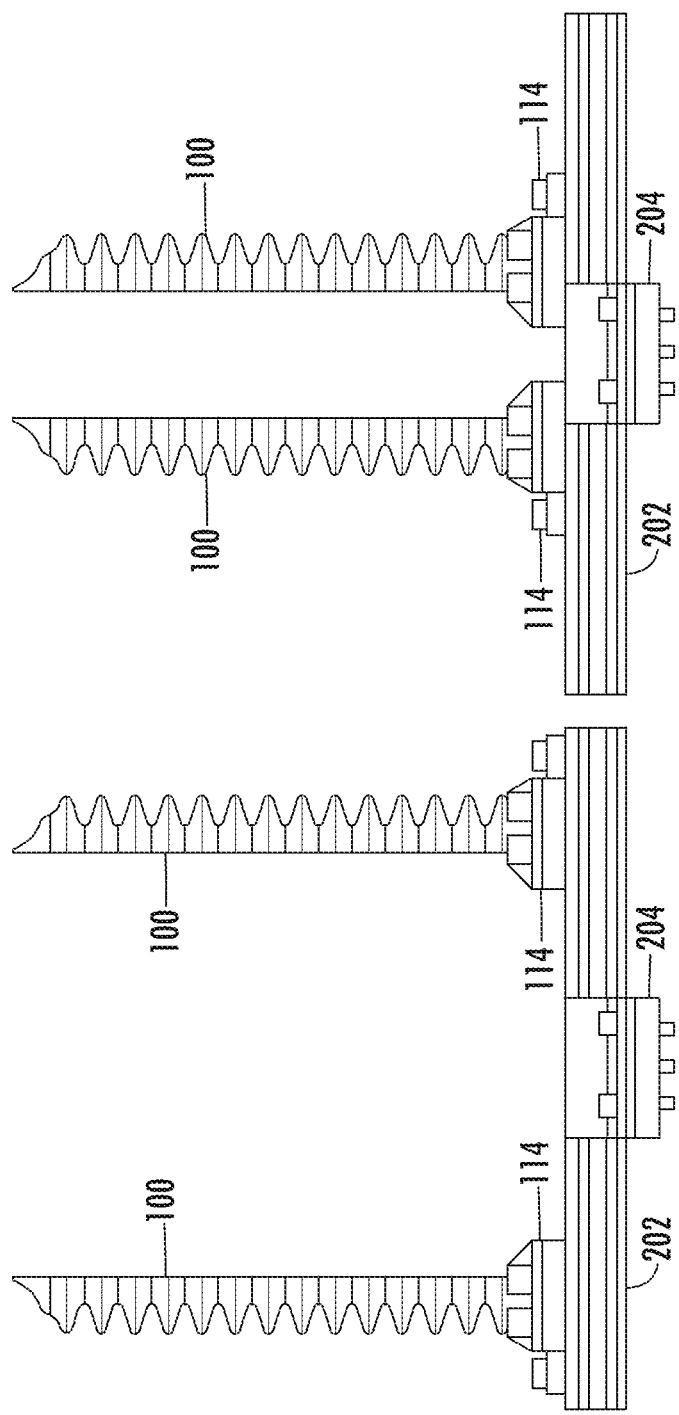

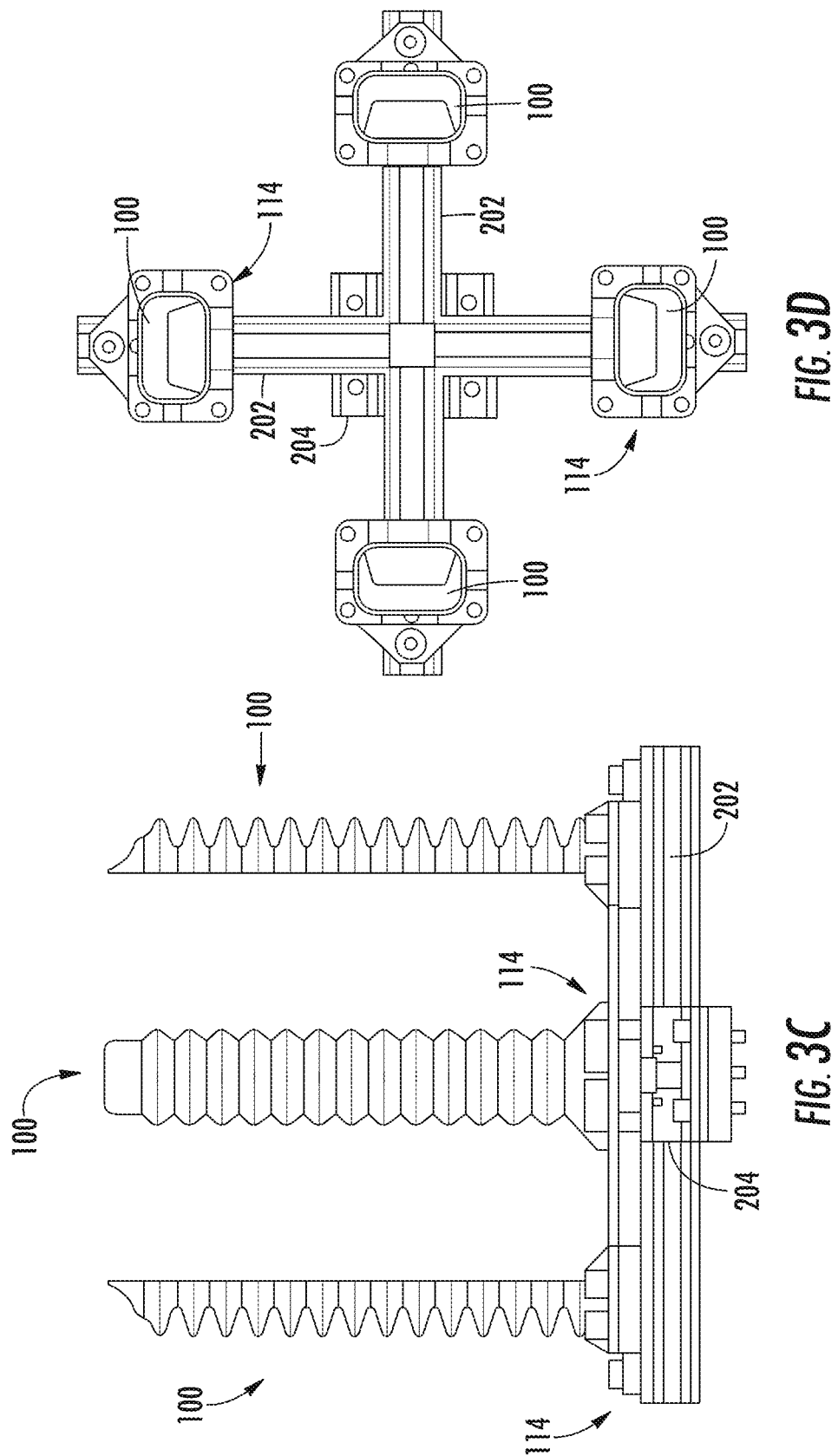

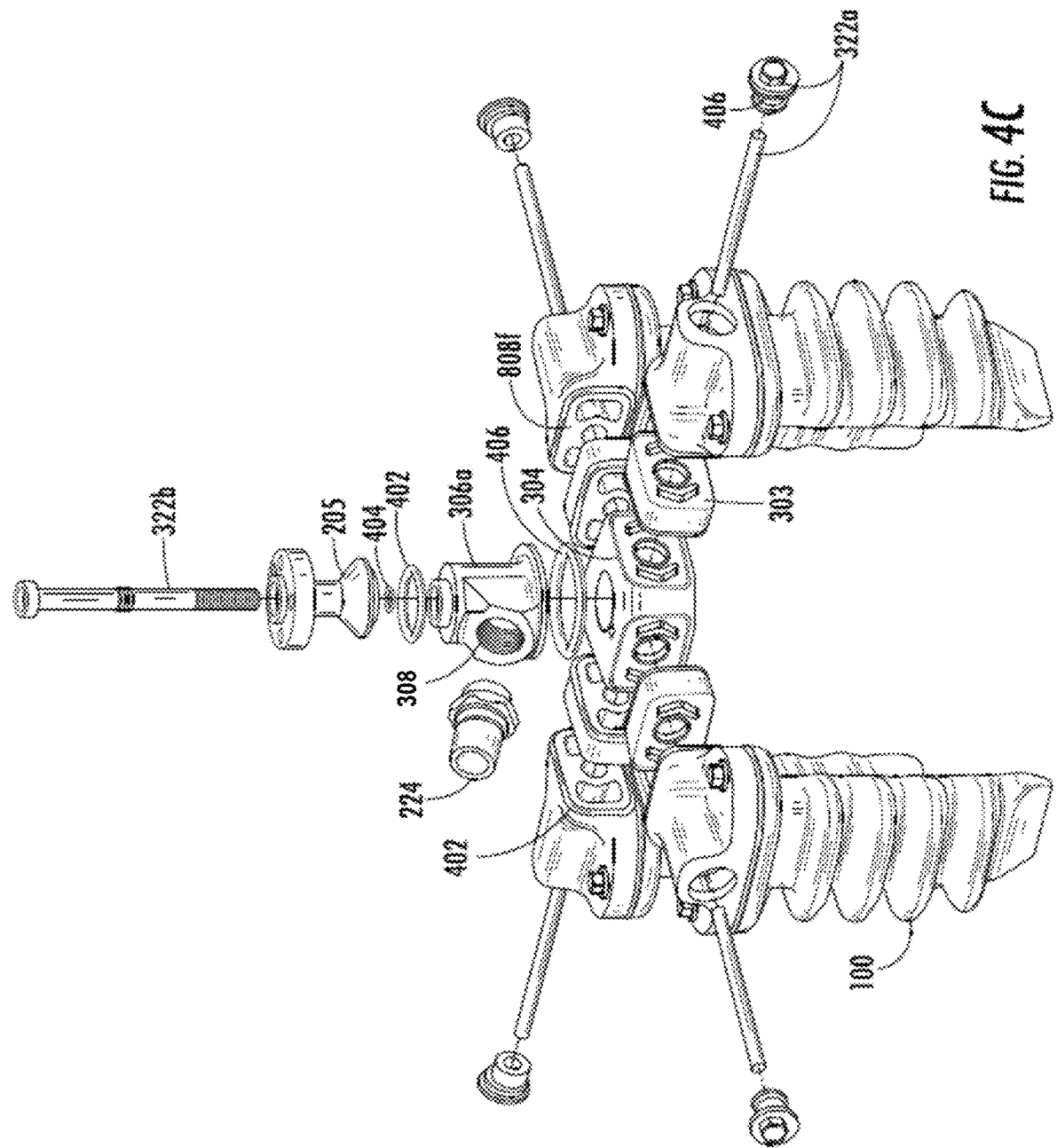

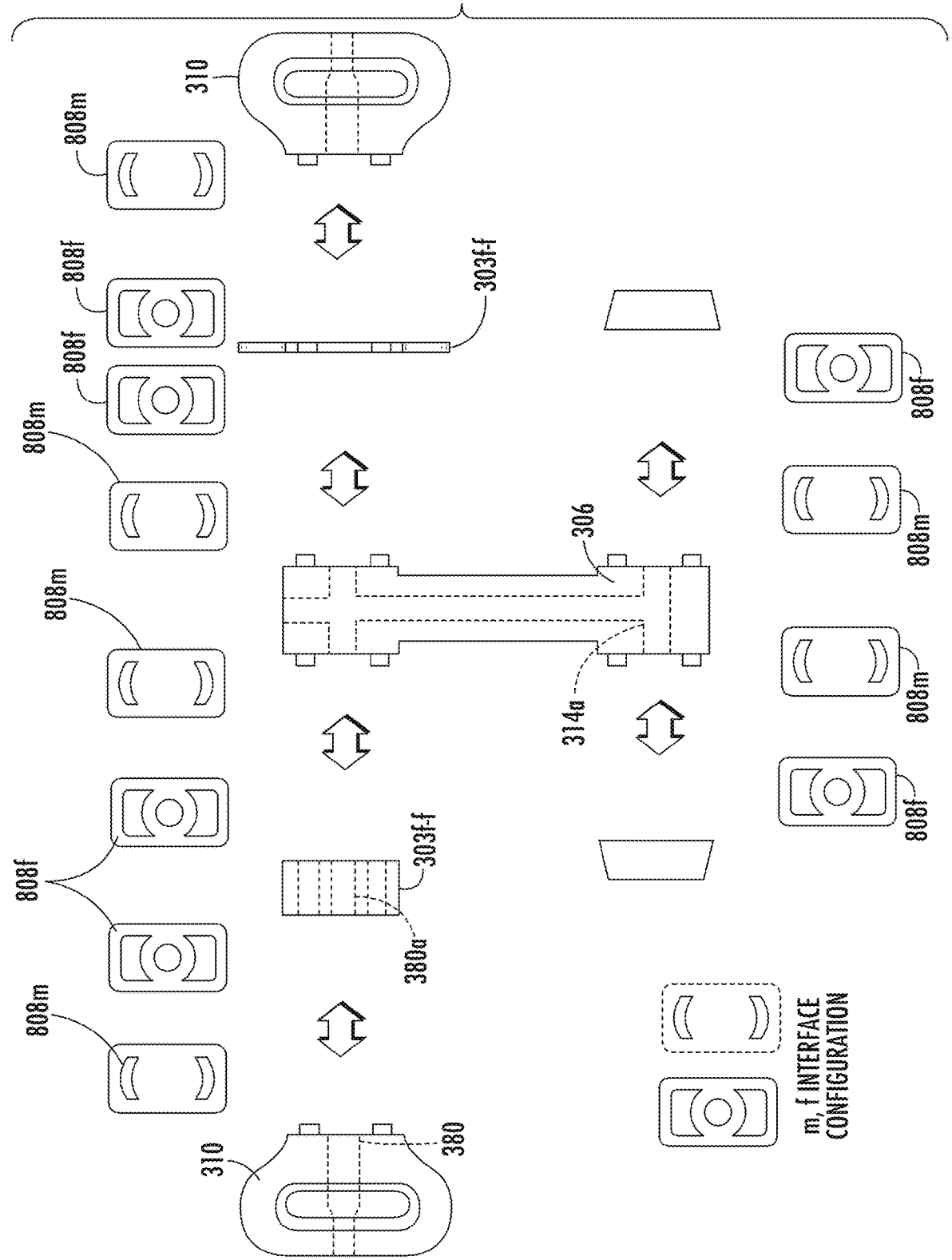

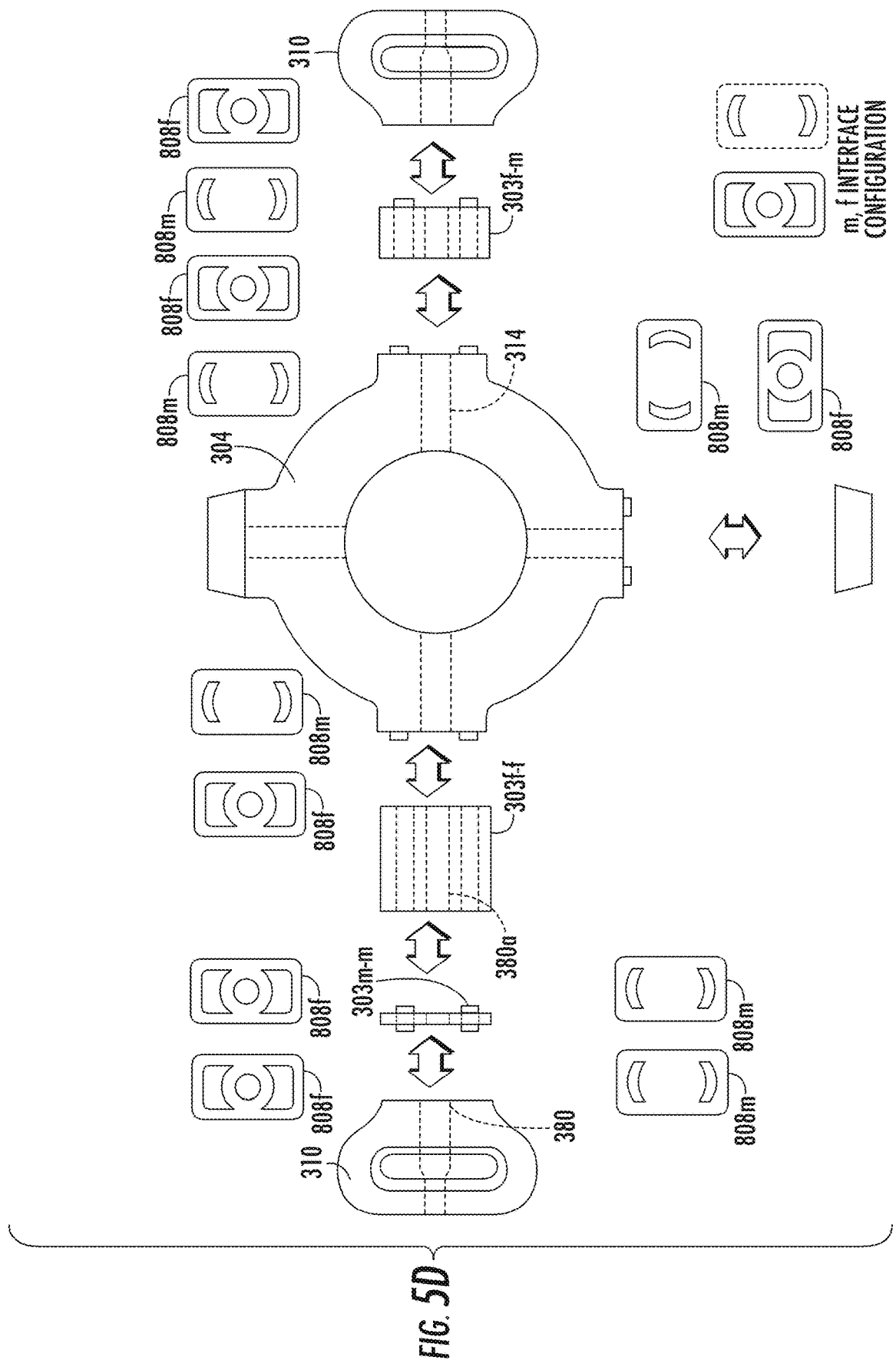

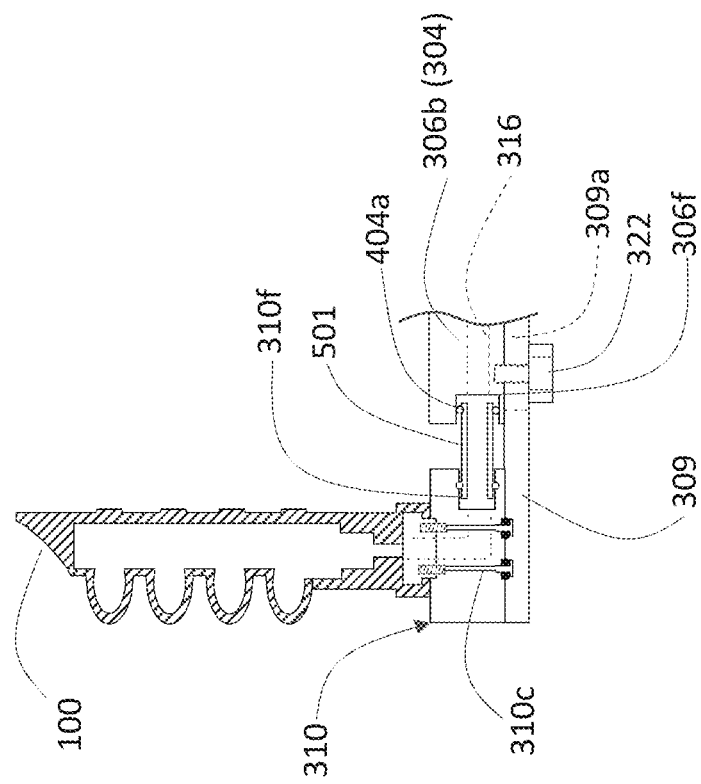

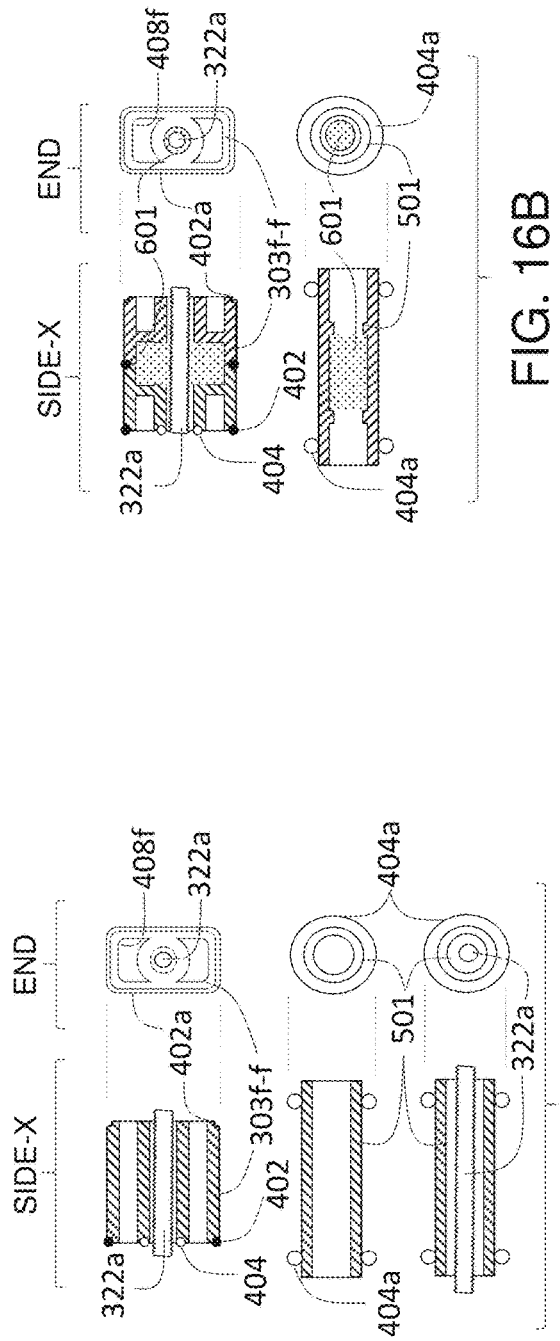
FIG. 16A
FIG. 16B
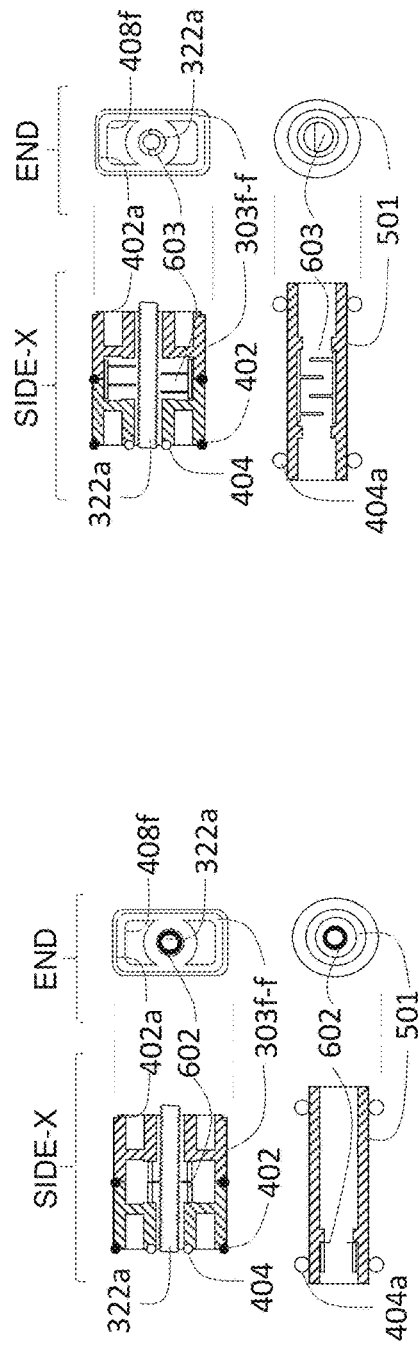
FIG. 16C
FIG. 16D

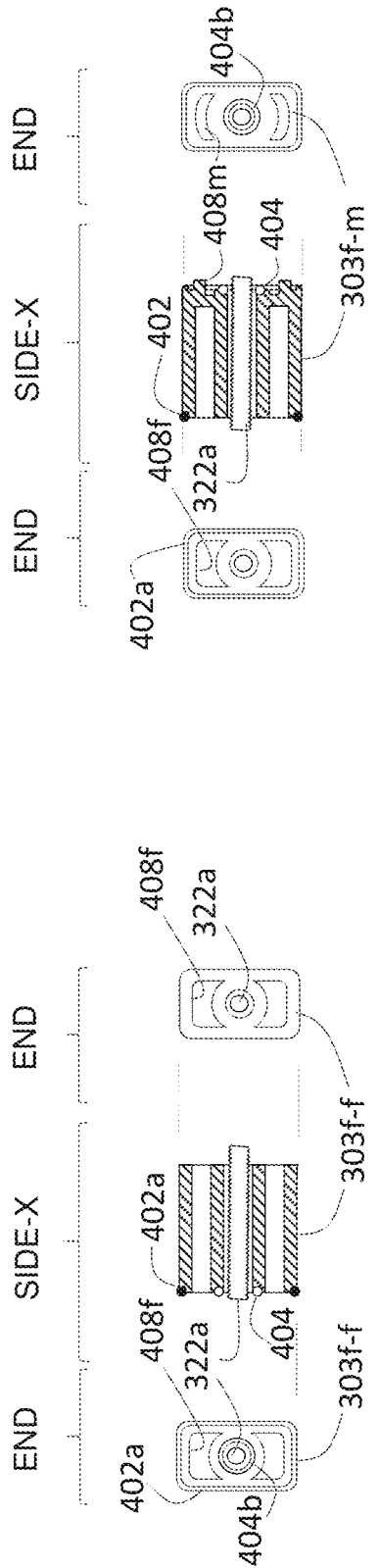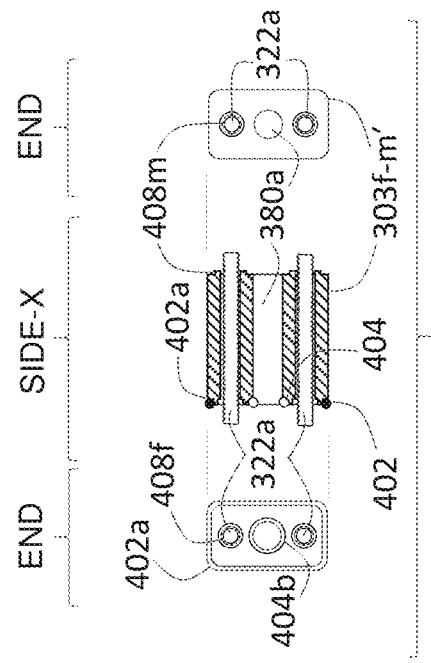

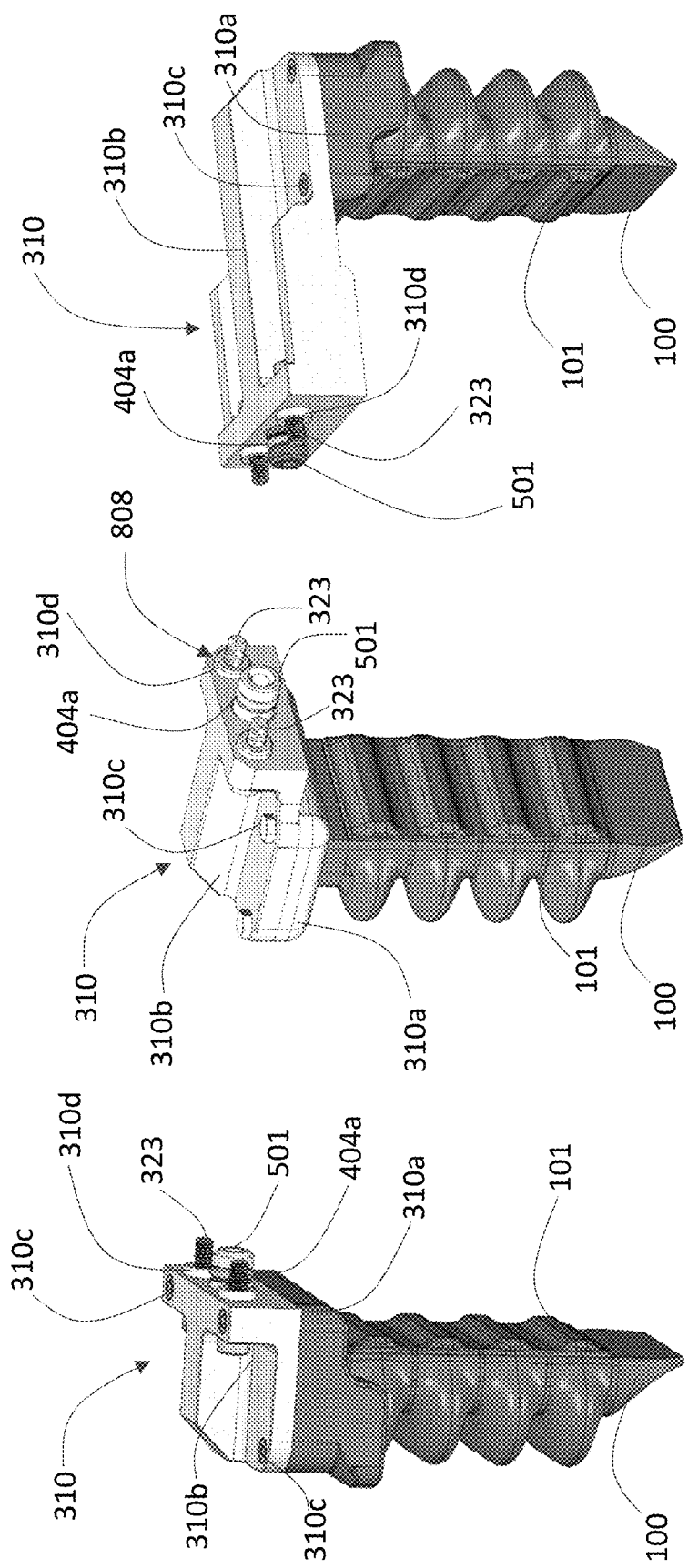

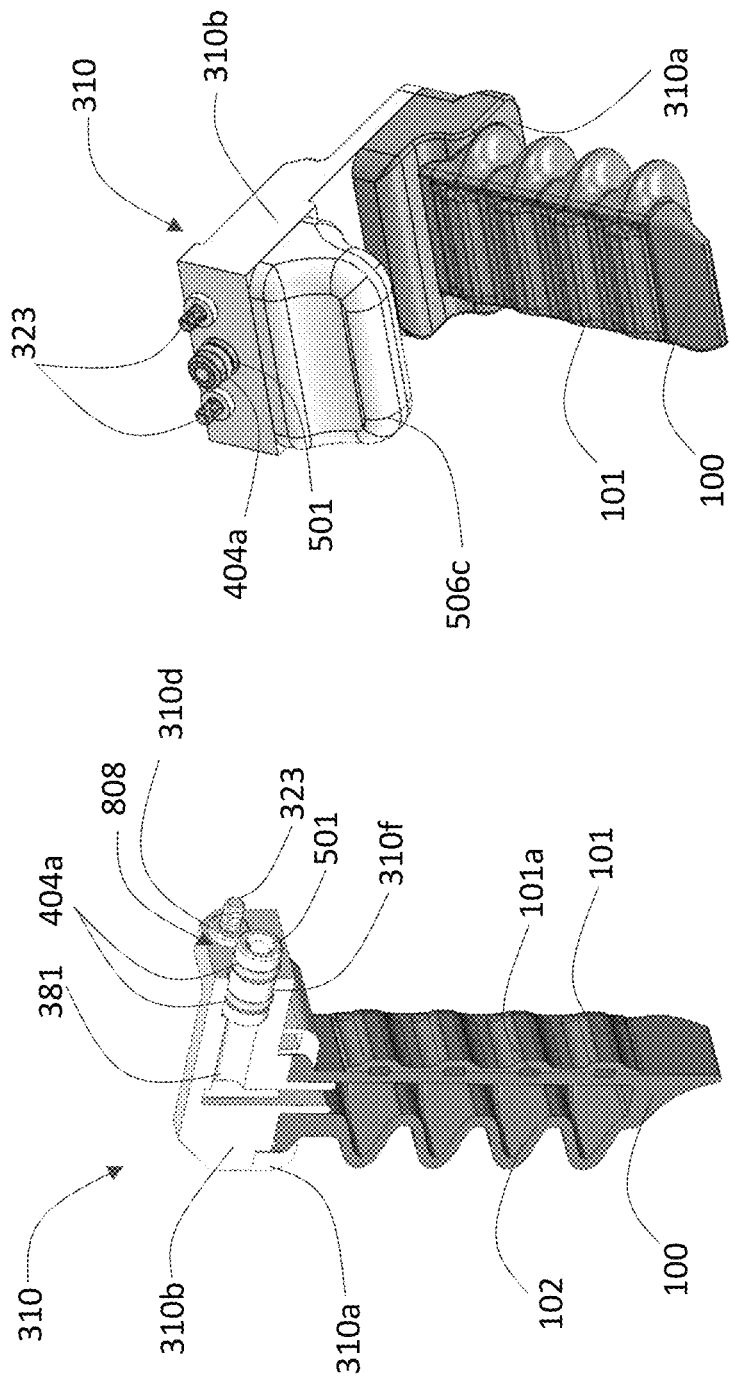

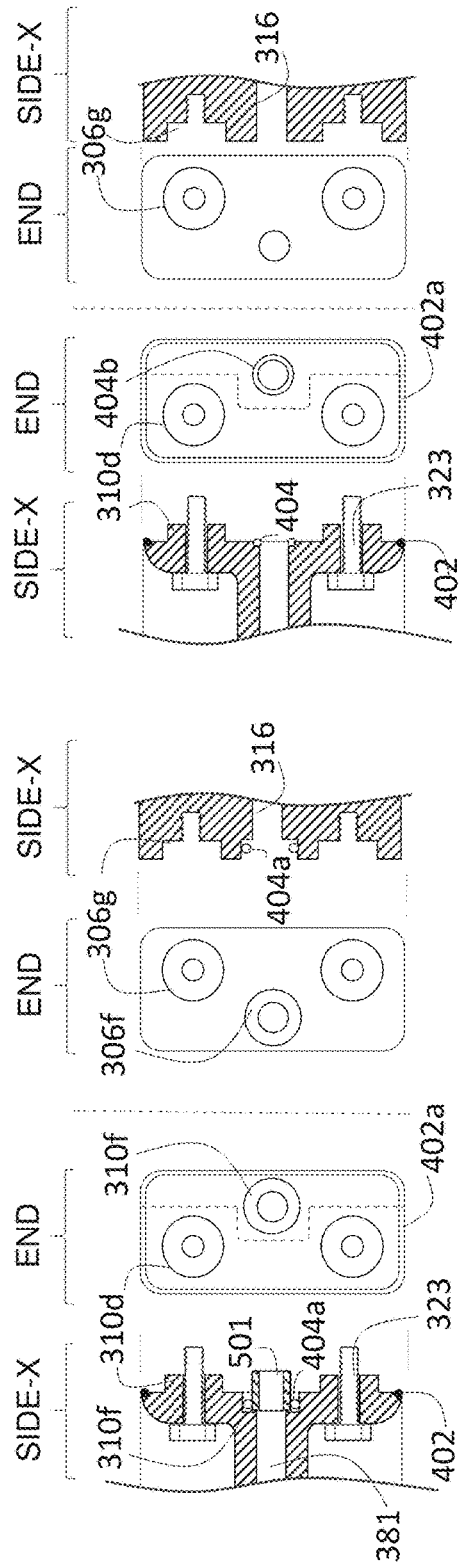
FIG. 19A
FIG. 19B
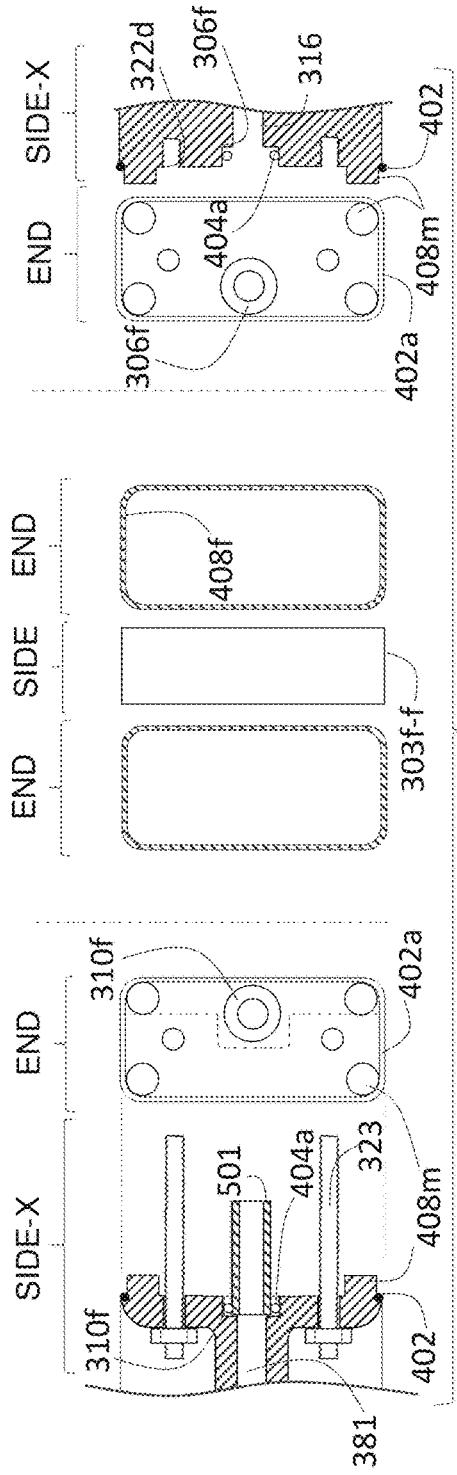
FIG. 19C

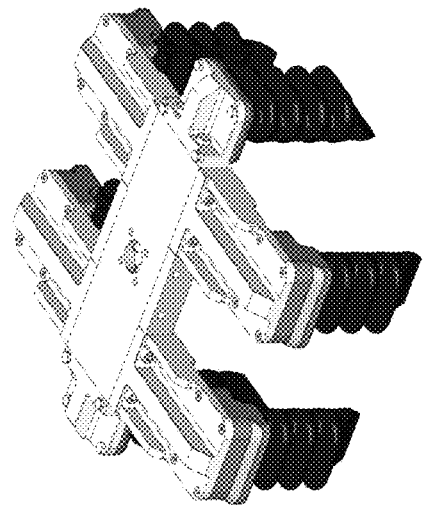
FIG. 20A
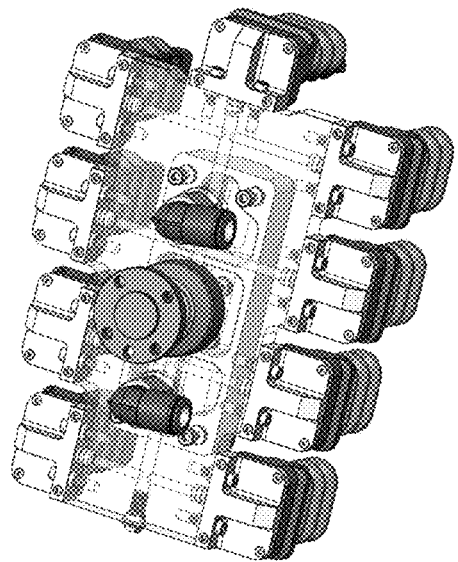
FIG. 20B
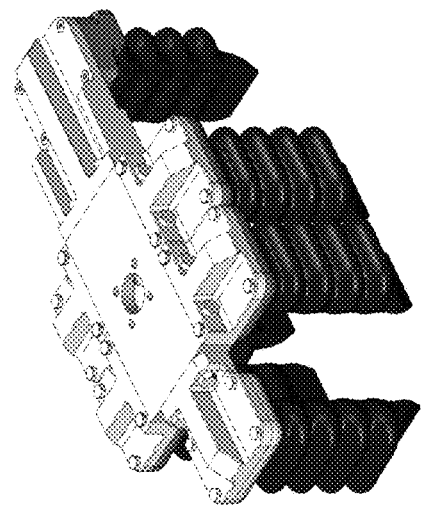
FIG. 20C
FIG. 20D

FIELD-ASSEMBLED SOFT GRIPPING FOR INDUSTRIAL AND COLLABORATIVE ROBOTS

RELATED APPLICATIONS

This application is a continuation of, claims the benefit of and priority to previously filed U.S. patent application Ser. No. 16/366,374 filed Mar. 27, 2019, entitled "FIELD-ASSEMBLED SOFT GRIPPING FOR INDUSTRIAL AND COLLABORATIVE ROBOTS", which is hereby incorporated by reference in its entirety.

This application also claims priority to U.S. Provisional Patent Application Ser. No. 62/648,597, filed on Mar. 27, 2018, entitled "SINGLE FINGER MODULE DESIGNS"; to, U.S. Provisional Patent Application Ser. No. 62/664,765, filed on Apr. 30, 2018, entitled "SINGLE FINGER MODULE DESIGNS"; and to U.S. Provisional Patent Application Ser. No. 62/795,892, filed on Jan. 23, 2019, entitled "FIELD-ASSEMBLED SOFT GRIPPING FOR INDUSTRIAL AND COLLABORATIVE ROBOTS" The contents of the aforementioned applications are incorporated herein by reference.

FIELD OF THE DISCLOSURE

The disclosure relates generally to industrial and collaborative robotic gripping solutions, and to novel structures useful in general and in food contact automation.

BACKGROUND

Many food articles, particularly with fresh foods, tend to be vulnerable—to damage or bruise easily. Special-purpose conveying and processing equipment for vulnerable or different-shaped articles is not uncommon. However, robot manipulators or arms (e.g., industrial or collaborative robots) often fail to solve the distinct problems of high acceleration handling of food, such as moving vulnerable foods at high acceleration while avoiding bruising or deformation, or handling high variability in shape, size, and mass.

For this reason, among others, in food handling businesses, industrial robotics have not been adopted as widely or rapidly as in manufacturing or more durable or robust items. Similarly, in non-food businesses with similarly challenging items to be picked and placed—vulnerable or deformable or different-shaped articles—adoption has lagged fields with more robust, predictable workpieces.

Sometimes, even more constraints apply—some handling environments require food contact design, hygienic design and/or washdown capability.

Inflatable soft robotic grippers are capable of constraining, grasping, picking and placing diverse food shapes and sizes with adaptive and/or adaptively conformal gripping, with non-bruising and non-deforming forces. However, no high-acceleration current solution in robust, industrial soft robotics synergistically or simultaneous solves enough domain problems to compel rapid adoption. In addition, none is amenable to field assembly and field deployment in food contact, hygienic and/or washdown environments.

SUMMARY

Exemplary embodiments relate to apparatuses and methods for providing soft robotic gripping solutions for gripping or grasping a target object or article.

According to one aspect of an embodiment of the present invention, a soft robotic gripper may include component parts capable of being assembled for or at the terminus of an industrial robot arm, for providing adaptive gripping of a product. The soft robotic gripper may include a hub capable of mounting to the terminus of the robotic arm, the hub having a pneumatic inlet formed therethrough leading to a plurality of outlets. A plurality of finger mount assemblies may be. pneumatically coupled to respective outlets. Each finger mount assembly may be assembled to include an inflatable finger, a finger mount, one or more pneumatic seals, and/or a tension fastener. The inflatable finger may have having an elastomer body that receives pneumatic inflation and vacuum via a fluid port. The elastomer body may bend under inflation in a first direction and under vacuum in a second direction. The finger mount may include a pneumatic passage capable of connecting to the fluid port. The channel member, such as a coupling or spacer, may include a pneumatic channel capable of connecting the pneumatic passage and a respective outlet. Two pneumatic seals may be capable of insertion surrounding the pneumatic channel of the channel member. The tension fastener may be capable of securing the finger mount to the hub. Securing the finger mount via the tension fastener may seal the pneumatic channel with the first pneumatic seal and the second pneumatic seal under compression.

Further optionally, the gripper may comprise first microbial ingress seals capable of insertion surrounding one of the two pneumatic seals, at each interface where an outer surface of the hub meets an outer surface of each respective finger mount, compressed between the hub and each finger mount.

Alternatively, or in addition, the channel member, such as a coupling, may include a cylindrical tube (optionally non-cylindrical), and one of the pneumatic seals may be compressed (e.g., radially) between an outer cylindrical wall of the tube and an inner cylindrical wall of a receiving receptacle in the finger mount. The remaining one of the pneumatic seals may be compressed (e.g., radially) between an outer cylindrical wall of the tube and an inner cylindrical wall of a receiving receptacle in the hub. Optionally, the tension fastener may pass through a respective pilot protrusion of the finger mount and pilot receptacle of the hub, and fastens under tension from the finger mount and in a direction of the hub.

Further alternatively, or in addition, the tension fastener may pass through a respective pneumatic passage of the finger mount and an outlet of the hub, and fastens under tension from the finger mount and in a direction of the hub. In some cases, the hub may be matched to the finger mounts via a plurality of common mechanical interfaces matching the outlets to the pneumatic passages, and the channel member may include at least one spacer. Each spacer may have a pneumatic interface bridging between a respective outlet and pneumatic passage. Respective tension fastener may pass through the pneumatic interface to secure a respective finger mount to the hub via the one or more spacers. One or more spacers may be compressed (e.g., axially, and/or by the same force applied by the tension fastener, and/or within an accepting groove) between the respective finger mount and the hub.

The soft robotic gripper may optionally include a palm capable of forming a plenum chamber between the outlets of the hub and the palm, and a manifold of channels leading from the palm. Each pneumatic passage of each finger mount may be capable of pneumatically coupling a respective channel of the palm to a respective inflatable finger.

Optionally, the hub may have a plurality of fastener anchors adjacent the outlets, to which the tension fasteners are capable of being secured. In one example, each tension fastener may be capable of securing a pair of finger mounts to the hub by passing through respective pneumatic passages of the pair of finger mounts and a pair of outlets of the hub, and may be capable of fastening under tension from one finger mount to a remaining finger mount, compressing the hub between the one finger mount and the remaining finger mount. The fastener anchors may each include a tapped hole formed in the hub, and the tension fasteners may each include an elongated member having machine screw threads, mating to a receiving fastener.

According to another aspect of an embodiment of the present invention, a method for assembling a soft robotic gripper may provide adaptive gripping of a product. The method may include arranging a finger mount including a passage capable of connecting to the fluid port together with a hub having a pneumatic inlet formed therethrough leading to a plurality of outlets. The passage of the finger mount may be connect with a respective outlet of the hub via a channel member including a pneumatic channel. A compressible pneumatic seal may be arranged toward each end of the pneumatic channel. The finger mount may be secured to the hub in compression using a tension fastener to seal the pneumatic channel with both pneumatic seals under compression (e.g., axial or radial). Optionally, the hub may be mounted to the terminus of a robotic arm, and the inflatable fingers may be pneumatically actuated via the pneumatic channel to bend under inflation in a first direction and under vacuum in a second direction.

Optionally, first microbial ingress seals may be inserted surrounding (e.g., having a larger diameter than, and along a parallel plane to) one of the two pneumatic seals, at each interface where an outer surface of the hub meets an outer surface of each respective finger mount. The first microbial ingress seals may be compressed (e.g., axially, and/or within an accepting groove) between the hub and each finger mount, optionally via the tension fastener.

Alternatively, or in addition, the channel member may include a cylindrical tube. In such a case, one of the pneumatic seals may be compressed (e.g., radially) between an outer cylindrical wall of the tube and an inner cylindrical wall of a receiving receptacle in the finger mount. The remaining one of the pneumatic seals may be compressed (e.g., radially) between an outer cylindrical wall of the tube and an inner cylindrical wall of a receiving receptacle in the hub.

Optionally, the tension fastener may be passed through a respective pilot protrusion of the finger mount and pilot receptacle of the hub. Alternatively, or in addition, the tension fastener may be passed through a respective pneumatic passage of the finger mount and an outlet of the hub.

In some examples, the hub may be matched to the finger mounts via a plurality of common mechanical interfaces matching the outlets to the pneumatic passages. In this case, the channel member may include one or more spacers, each spacer having a pneumatic interface bridging between a respective outlet and pneumatic passage. A respective tension fastener may be passed through the pneumatic interface to secure a respective finger mount to the hub via the at least one spacer. One or more spacers may be compressed (e.g., axially) between the respective finger mount and the hub. Optionally, a respective channel of a palm may be pneumatically coupled to a respective inflatable finger via a pneumatic passage of each finger mount, the palm capable of forming a plenum chamber between the outlets of the hub and the palm, and a manifold of channels leading from the palm.

In another aspect of an embodiment of the invention, a soft robotic gripper may have component parts capable of being assembled for or at the terminus of an industrial robot arm for providing adaptive gripping of an object. The soft robotic gripper may include a hub capable of mounting to the terminus of the robotic arm, the hub having a pneumatic inlet formed therethrough leading to a radial outlet, and a fastener anchor adjacent the radial outlet. A palm may have a plenum cavity formed therein, capable of forming a plenum chamber between the radial outlet of the hub and the palm, and a manifold of radial channels capable of facing respective fastener anchors when the plenum chamber is formed. Each inflatable finger of a plurality of inflatable fingers may have an elastomer body which bends under inflation in a first direction and under vacuum in a second direction, and a fluid port capable of providing pneumatic inflation and deflation. Each finger mount of a plurality of finger mounts may have a pneumatic passage capable of connecting a respective radial channel of the palm to a respective inflatable finger. Each tension fastener of a plurality of tension fasteners may be capable of securing a respective finger mount to the palm in compression by passing through a respective pneumatic passage and the plenum chamber and fastening under tension to the fastener anchor.

Optionally, the palm may be matched to the finger mounts via a plurality of common mechanical interfaces matching the radial channels to the pneumatic passages. One or more spacers may include a pneumatic interface bridging between a respective radial channel and pneumatic passage, a respective tension fastener passing through the pneumatic interface to secure a respective finger mount to the palm via the one or more spacers.

Further optionally, pneumatic seals capable of insertion surrounding each matched radial channel and pneumatic passage may be compressed (e.g., axially, and/or within an accepting groove) between the palm and each finger mount. In this case, first microbial ingress seals may be capable of insertion surrounding the pneumatic seal, at each interface where an outer surface of the palm meets an outer surface of each respective finger mount, compressed (e.g., axially, and/or within an accepting groove) between the palm and each finger mount.

Alternatively, or in addition, the hub may be formed as a lower hub including the radial outlet and the fastener anchor and an upper hub including the pneumatic inlet. The lower hub and upper hub may be capable of compressing the palm (e.g., "sandwiched" between the lower and upper hub, with ingress seals compressed between each of the lower and upper hub and the palm) and connecting the radial outlet to the pneumatic inlet.

Optionally, second pneumatic seals may be capable of insertion surrounding the upper and lower hub and capable of compressively and pneumatically sealing the upper hub and lower hub to the palm. Further optionally, second microbial ingress seals may be capable of insertion at each interface where an outer surface of the palm meets an outer surface of each of the respective upper hub and lower hub, compressed between the upper hub, palm, and lower hub.

In still another aspect of an embodiment of the present invention, a soft robotic gripper may have component parts capable of being assembled for or at the terminus of an industrial robot arm for providing adaptive gripping of a product. The soft robotic gripper may include a hub capable of mounting to the terminus of the robotic arm, the hub having a pneumatic inlet formed therethrough leading to a plurality of outlets. Each inflatable finger of a plurality of inflatable fingers, may have an elastomer body which bends under inflation in a first direction and under vacuum in a second direction, and a fluid port capable of providing pneumatic inflation and deflation. Each finger mount of a plurality of finger mounts may have a pneumatic passage capable of connecting a respective outlet of the hub to a respective inflatable finger. Each tension fastener of one or more tension fasteners may be capable of securing a finger mount to the hub in compression by passing through a respective pneumatic passage of the finger mount and an outlet of the hub, and fastening under tension from the finger mount and in a direction of the hub.

Optionally, the hub may be matched to the finger mounts via a plurality of common mechanical interfaces matching the outlets to the pneumatic passages. One or more spacers may each include a pneumatic interface bridging between a respective outlet and pneumatic passage, a respective tension fastener passing through the pneumatic interface to secure a respective finger mount to the hub via one or more spacers spacer, the spacer(s) being compressed between the respective finger mount and the hub.

In some examples, first pneumatic seals are capable of insertion surrounding each matched outlet and pneumatic passage, compressed between the hub and each finger mount. Optionally, first microbial ingress seals are capable of insertion surrounding the pneumatic seal, at each interface where an outer surface of the hub meets an outer surface of each respective finger mount, compressed between the hub and each finger mount.

Alternatively, or in addition, the soft robotic gripper may include a palm capable of forming a plenum chamber between the outlets of the hub and the palm, and a manifold of channels leading from the palm. Each pneumatic passage of each finger mount may be capable of pneumatically coupling a respective channel of the palm to a respective inflatable finger. In this case, the hub may have a plurality of fastener anchors adjacent the outlets, to which the tension fasteners are capable of being secured.

In some examples, each tension fastener may be capable of securing a pair of finger mounts to the hub by passing through respective pneumatic passages of the pair of finger mounts and a pair of outlets of the hub, and fastening under tension from one finger mount to a remaining finger mount, compressing the hub between the one finger mount and the remaining finger mount.

In each aspect of the embodiments of the present invention, the hub may be formed from metal material, and the palm and finger mounts may have a volumetric mass density less than ½ that of the hub of metal material.

In each aspect of the embodiments of the present invention, fastener anchors may each comprise a tapped hole formed in the hub, and the tension fasteners may each comprise an elongated member having machine screw threads, mating to a receiving fastener.

In each aspect of the embodiments of the present invention, optionally, product contact areas of the finger may be as smooth or smoother than substantially 32 microinch average roughness (Ra) and non product contact areas of the gripper as smooth or smoother than substantially than approximately 125 microinch (Ra).

BRIEF DESCRIPTION OF THE DRAWINGS

FIGS. 2A-2C depict schematic side views of an adjustable or configurable soft-robotic two-finger gripper, with FIG. 2A being in a wider configuration, FIG. 2B being a narrower configuration, and FIG. 2C showing mounting on a robot arm.

FIGS. 3A-3D depict schematic views of an adjustable or configurable soft-robotic four-finger gripper, with FIG. 3A being a side schematic view in a wider configuration, FIG. 3B being a top schematic view in a wider configuration, FIG. 3C being a side schematic view in a narrower configuration, and FIG. 3D being a top schematic view in a narrower configuration.

FIG. 4C is an exploded perspective view of the field-assembled soft robotic gripper of FIG. 4B.

FIG. 5C is a schematic top view of a four-interface parallel configuration similar to that of FIG. 5B, highlighting common mechanical interfaces.

FIG. 5D is a schematic top view of a four-interface radial configuration similar to that of FIG. 5A, highlighting common mechanical interfaces.

FIGS. 16A, B, C, and D are schematic side views of a variety of spacers and pneumatic couplings used in FIGS. 1-15, employing respectively a straight air passage, a filter, a flow constriction, and vibration baffles or damping.

FIGS. 17A, B, and C are schematic side views of a variety of spacers used in FIGS. 1-15, employing respectively a female-female coupling and sealing, a female-male coupling and sealing, and a dual fastener configuration.

FIGS. 18A through 18E are schematic perspective views of a field-assembled soft robotic gripper similar to that of FIGS. 9, 10, 15A and 15B.

FIGS. 19A, B, and C are schematic side views of a variety of finger modules used in FIGS. FIGS. 9, 10, 15A, 15B, and 18A-18E, employing respectively a pneumatic coupling connection, a direct connection without pneumatic coupling, and a pneumatic coupling via a spacer.

FIGS. 20A through 20D are schematic perspective views of a variety of field-assembled soft robotic grippers, including different size/interface hubs and finger modules.

DETAILED DESCRIPTION OF THE PREFERRED EMBODIMENTS

Soft Robotic Grippers

Figure 1:
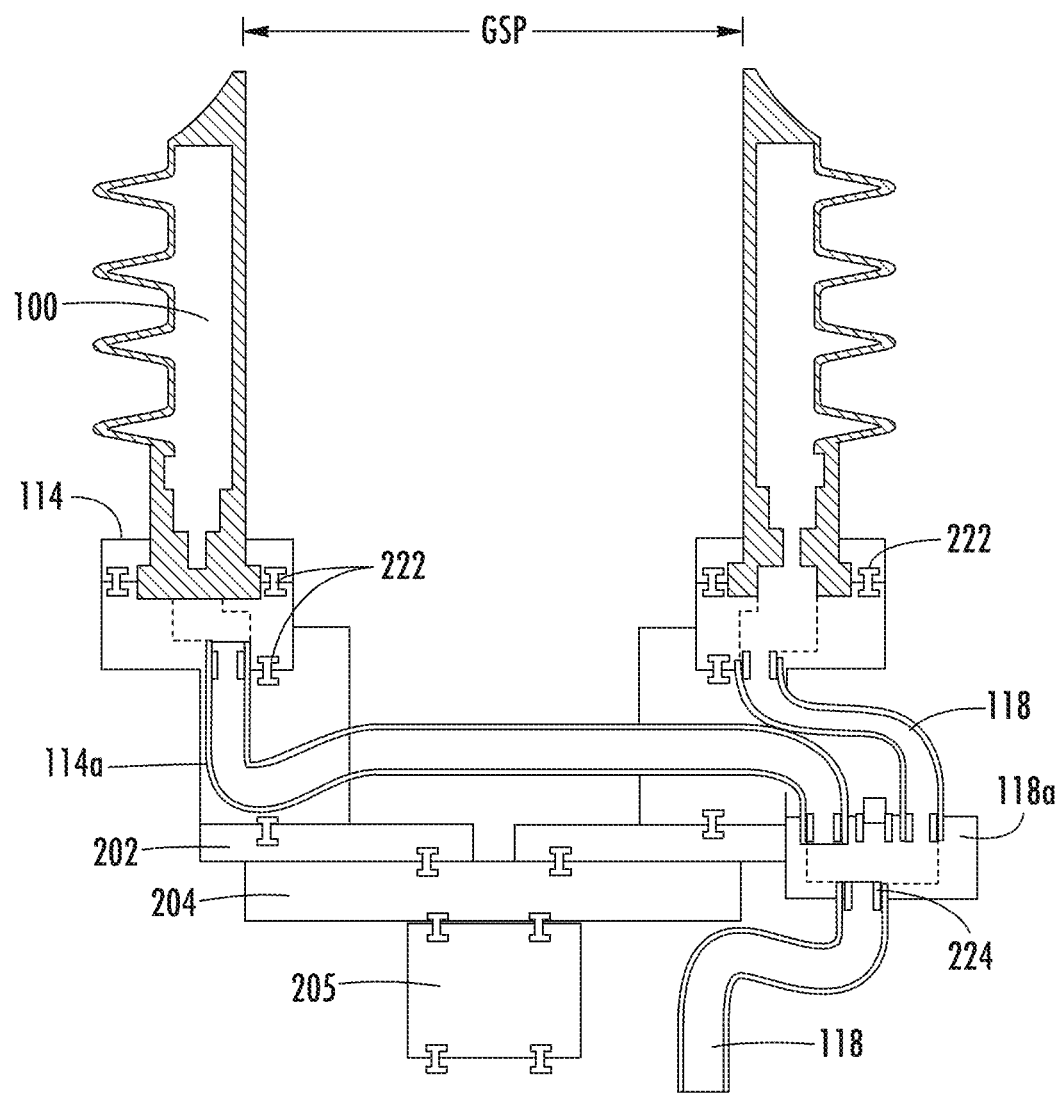
FIG. 1 is a schematic side view of an adjustable or configurable soft-robotic gripper.

FIGS. 1A-1D depict various examples of soft robotic grippers.

Soft or inflatable fingers or grippers may move in a variety of ways. For example, inflatable fingers may bend, or may twist, as in the example of the soft tentacle ("actuator") described in U.S. patent application Ser. No. 14/480,106, entitled "Flexible Robotic Actuators" and filed on Sep. 8, 2014. In another example, soft or inflatable fingers may be linear actuators, as described in U.S. patent application Ser. No. 14/801,961, entitled "Soft Actuators and Soft Actuating Devices" and filed on Jul. 17, 2015. Still further, soft or inflatable fingers may be formed of sheet materials, as in U.S. patent application Ser. No. 14/329,506, entitled "Flexible Robotic Actuators" and filed on Jul. 11, 2014. In yet another example, soft or inflatable fingers may be made up of composites with embedded fiber structures to form complex shapes, as in U.S. patent application Ser. No. 14/467,758, entitled "Apparatus, System, and Method for Providing Fabric Elastomer Composites as Pneumatic Actuators" and filed on Aug. 25, 2014. One of ordinary skill in the art will recognize that other configurations and designs of soft or inflatable fingers are also possible and may be employed with exemplary embodiments described herein.

Configurable Soft Grippers

As shown in FIG. 1 and FIGS. 2A-3D, soft gripper fingers 100 may be used together with T-shaped modular rail systems, with the provision of a finger mount or interface 114 that allows two or more fingers 100 to be arranged into a tool using combinations of T-shaped rails and T-shape rail accessories. The interface 114 may be made of a food- or medically-safe material, such as polyethylene, polypropylene, polycarbonate, polyetheretherketone, acrylonitrile-butadiene-styrene ("ABS"), or acetal homopolymer.

A soft robotic gripper may include one or more soft robotic members 100, which may take organic prehensile roles of finger 100, arm, tail, or trunk, depending on the length and actuation approach. The present disclosure tends to use "finger" to describe the members 100, but any bendable soft robotic member may be used in place of a finger 100. In the case of inflating and/or deflating soft robotic members 100, two or more members may extend from a hub 204, 304, and the hub 204, 304 may include a manifold for distributing fluid (gas or liquid) to the gripper members 100 and/or a plenum for stabilizing fluid pressure to the manifold and/or gripper members. The members 100 may be arranged like a hand, such that the soft robotic members act, when curled, as digits facing, a "palm" 204, 204 against which objects are held by the digits 100; and/or the members may also be arranged like an cephalopod, such that the soft robotic members act as arms surrounding an additional central hub actuator or sub-effector (suction, gripping, or the like).

As shown in FIG. 1 and FIGS. 2A-3D, a member or finger 100 may extend from a proximal end 112 to a distal end 110. The proximal end 112 may connect to a finger mount or interface 114. The finger mount 114 may be made of a hygienic or food contact material, such as polyethylene, polypropylene, polycarbonate, polyetheretherketone, acrylonitrile-butadiene-styrene ("ABS"), or acetal homopolymer. The finger mount 114 may be releasably coupled to one or both of the finger 100 and/or the flexible tubing 118, e.g., via a pneumatic coupling 224. The finger mount 114 houses and directs air to and from the finger 100 via a port in the finger 100. Different finger mounts 114 may have different sizes, numbers, or configurations of finger 100.

Figure 2C:
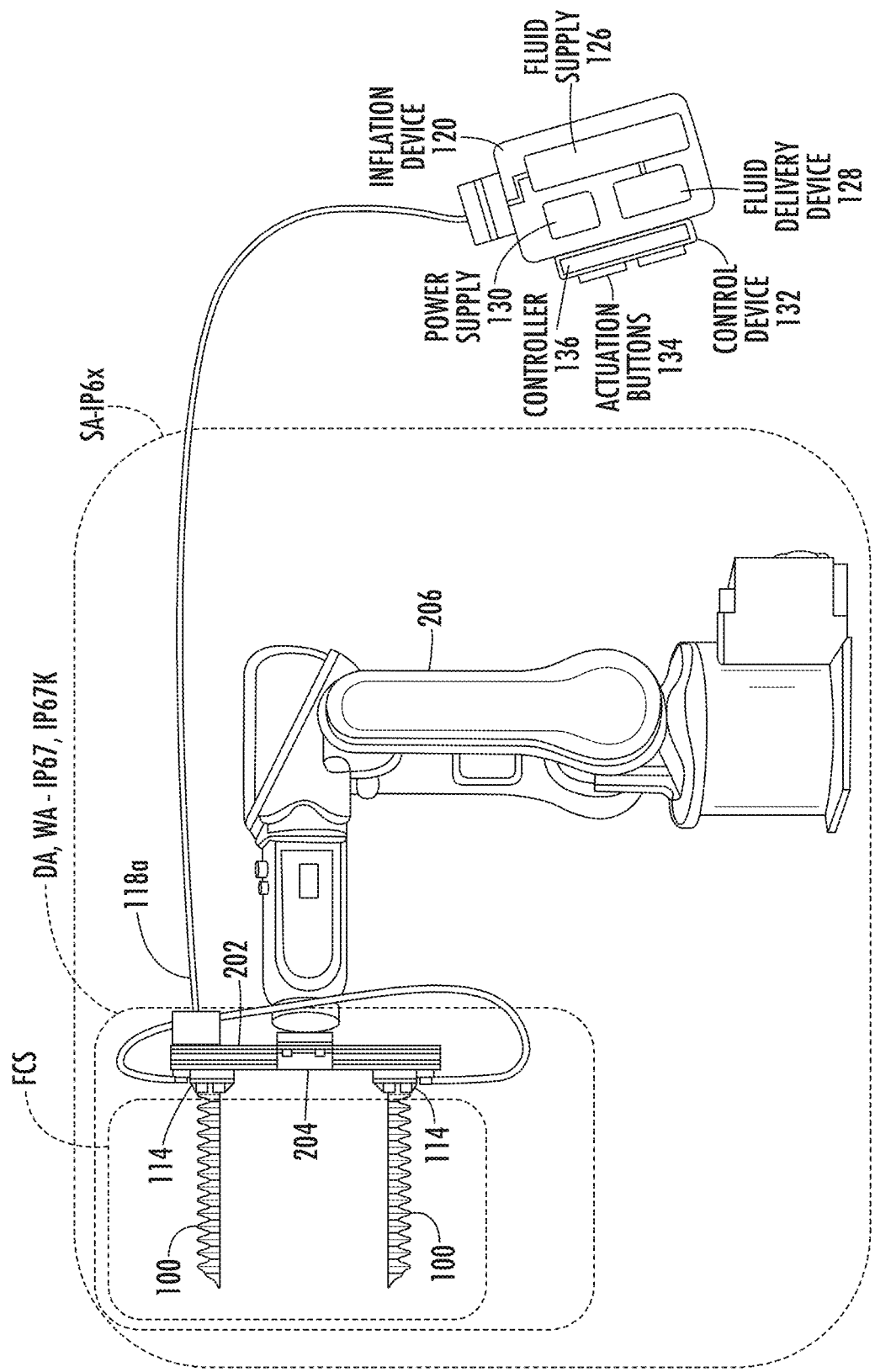

As shown in FIGS. 2A-2C, an inflatable finger 100 may be inflated with an inflation fluid, pneumatic or other, from an inflation device 120 through flexible tubing 118. Where pneumatic inflation/deflation is discussed herein, except where constraints particular to pneumatic operation are inherent or expressly discussed, other fluids may be used. The finger mount 114 may include or may be attached to a valve 116 for allowing air to enter the finger 100 but preventing air from exiting the finger 100 (unless the valve 116 is opened). The flexible tubing 118 may also or alternatively attach to an inflator valve 124 at the inflation device or controller for regulating the supply of air and/or vacuum at the location of the inflation device.

FIG. 2A depicts a side-view of a system in which two fingers 100 mounted to a rail system 202 form a robotic gripper. In this example, the fingers 100 are held to a length of the rail system using the mount 114, employing fasteners (e.g., bolts). FIG. 2B depicts a side view of the same system after the fingers 100 have been slid along the rails 202 to decrease the gripping span (GSP) between the fingers 100. For example, the fasteners of the finger mounts 114 may be loosened to allow the actuators 100 to slide along the rail 202, which allows the end-effector to be configured for objects of different size with the same device. The finger mounts 114 provide a sealed pneumatic inlet (e.g., quick change or ferrule) for pressurizing and depressurizing the fingers 100 via the tubing 118.

The inflation device 120 may include a fluid supply 126, which may be a reservoir for storing compressed air, liquefied or compressed carbon dioxide, liquefied or compressed nitrogen or saline, or may be a vent for supplying ambient air to the flexible tubing 118. The inflation device 120 may further includes fluid delivery device 128, such as a pump or compressor, for supplying inflation fluid from the fluid supply 126 to the actuator 100 through the flexible tubing 118. The fluid delivery device 128 may be capable of supplying fluid to the actuator 100 or withdrawing the fluid from the actuator 100. The fluid delivery device 128 may be powered by electricity.

As shown in FIG. 2C, an assembled effector may be secured to an industrial or collaborative robot (e.g., robotic arm) 206 via a mounting flange 204 on the rail 202 in order to enable the arm 206 to pick and place objects of interest. The mounting flange 204 on the rail 202 may be configured to mate with a corresponding flange on the robotic arm 206 to secure the end effector system robotic arm 206. An adapter 205 may be used to interface between the mounting flange 204 and different manufacturers' robot arm 206 mounts. A pneumatic passage may be provided through the mounting flange 204 to allow an inflation fluid to pass from the robotic arm 206 through the mounting flange 204, through the rail 202 and into the actuators 100. It should be noted that this style of adjustable gripper is not limited to the use of T-slot extrusion, other modular rail mounting systems may provide similar functionality.

FIG. 2C depicts a particular example in which an end effector is deployed on a robotic arm 206, but in some embodiments the fingers 100 may be deployed on a gantry or other mechanism. FIGS. 2A-2C depict individual fingers 100 that are relocatable, but the same principle may be applied to groups of fingers 100 that are movable with respect to each other. For example, the individual fingers of FIGS. 2A-2C could be replaced with groups of fingers 100 forming gripping mechanisms. The movement of the fingers 100 along the rail 202 (or other guidance mechanism) may be achieved manually (e.g., using adjustable components 114a that are moved by an operator) or automatically (e.g., using a motor, pneumatic feed, or other device suitable for effecting movement of the fingers 100).

The fingers 100 or grippers in this array may be driven in that the position of a finger 100 or a gripper can be changed via the action of a machine. For example, the fingers 100 may be driven via a motor that drives a screw or belt that is attached to the fingers 100, or by a pneumatically-actuated piston that is attached to the finger 100 or gripper.

Figure 3B:
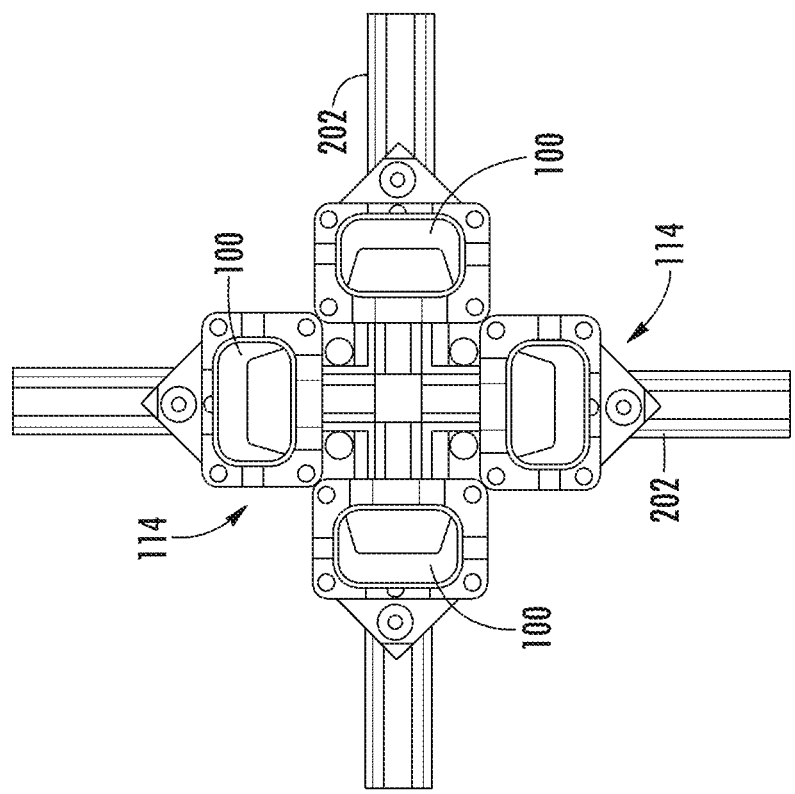
Figure 3A:
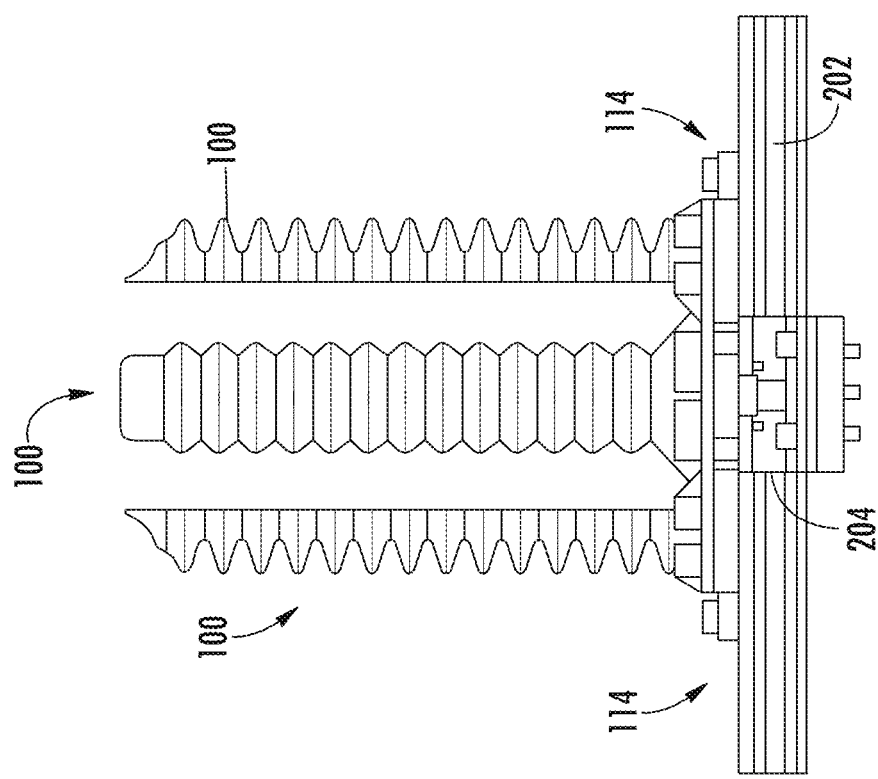

Accordingly, T-slot extrusion may be used to create grippers for which the fingers 100 can be reconfigured in one dimension (as shown in FIGS. 2A-2C), in two dimensions, and in three dimensions. For instance, FIG. 3A depicts a side view of four soft inflatable fingers 100 mounted to T-slot extrusions 202 in an "X" pattern, where the fingers 100 are set to a close configuration. FIG. 3B depicts a top view of the grippers shown in FIG. 3A. In FIG. 3C (side view) and 3D (top view), the fingers 100 of FIGS. 3A-3B have been reconfigured to be spaced farther apart to grip a larger object.

The systems shown in FIGS. 2A-3C are perhaps most useful for prototyping, which is consistent with the general utility of T-shaped rails. In production environments, successful solutions are more constrained. For example, production solutions must generally be more lightweight so that the gripper weight is a smaller proportion of the entire tool payload, can be moved/spun at high speed especially between picks, and/or are microbially ingress sealed and/or washable or sprayable.

Figure 4A:
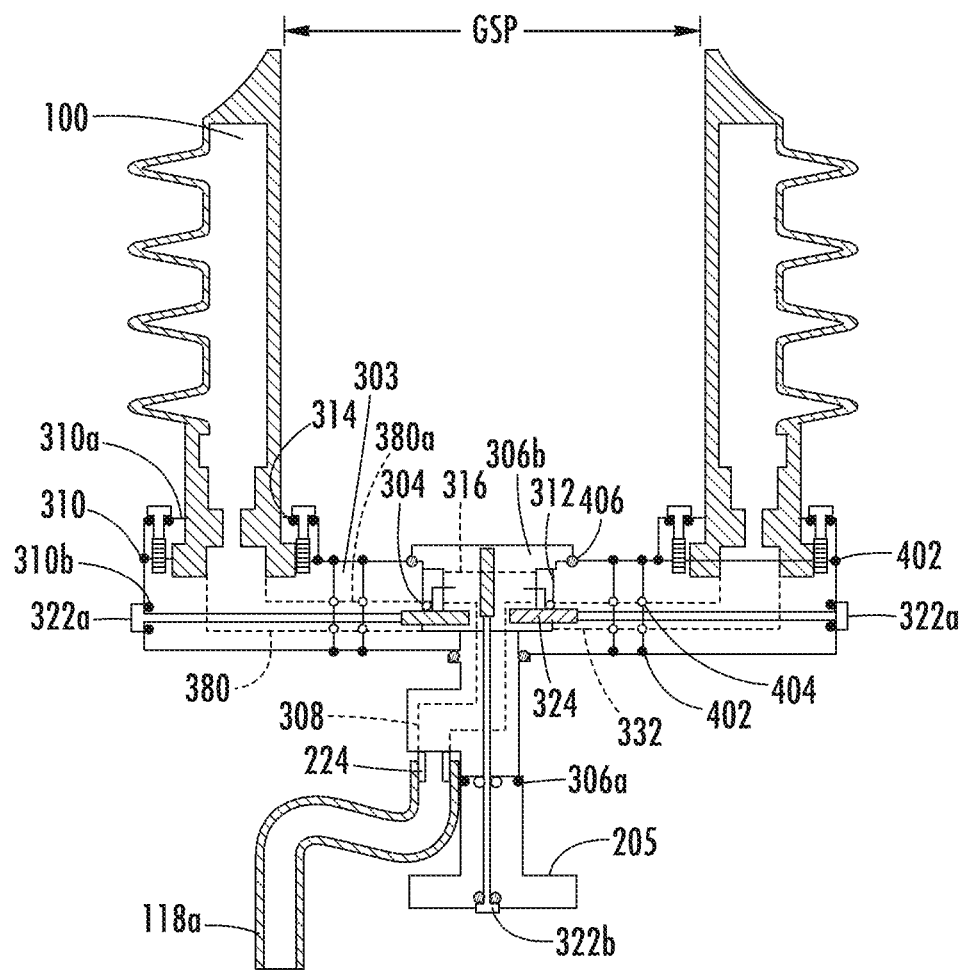
FIG. 4A shows a schematic side view of a field-assembled soft robotic gripper that includes provisions for lower mass, lower part count and sanitary sealing.
Figure 4B:
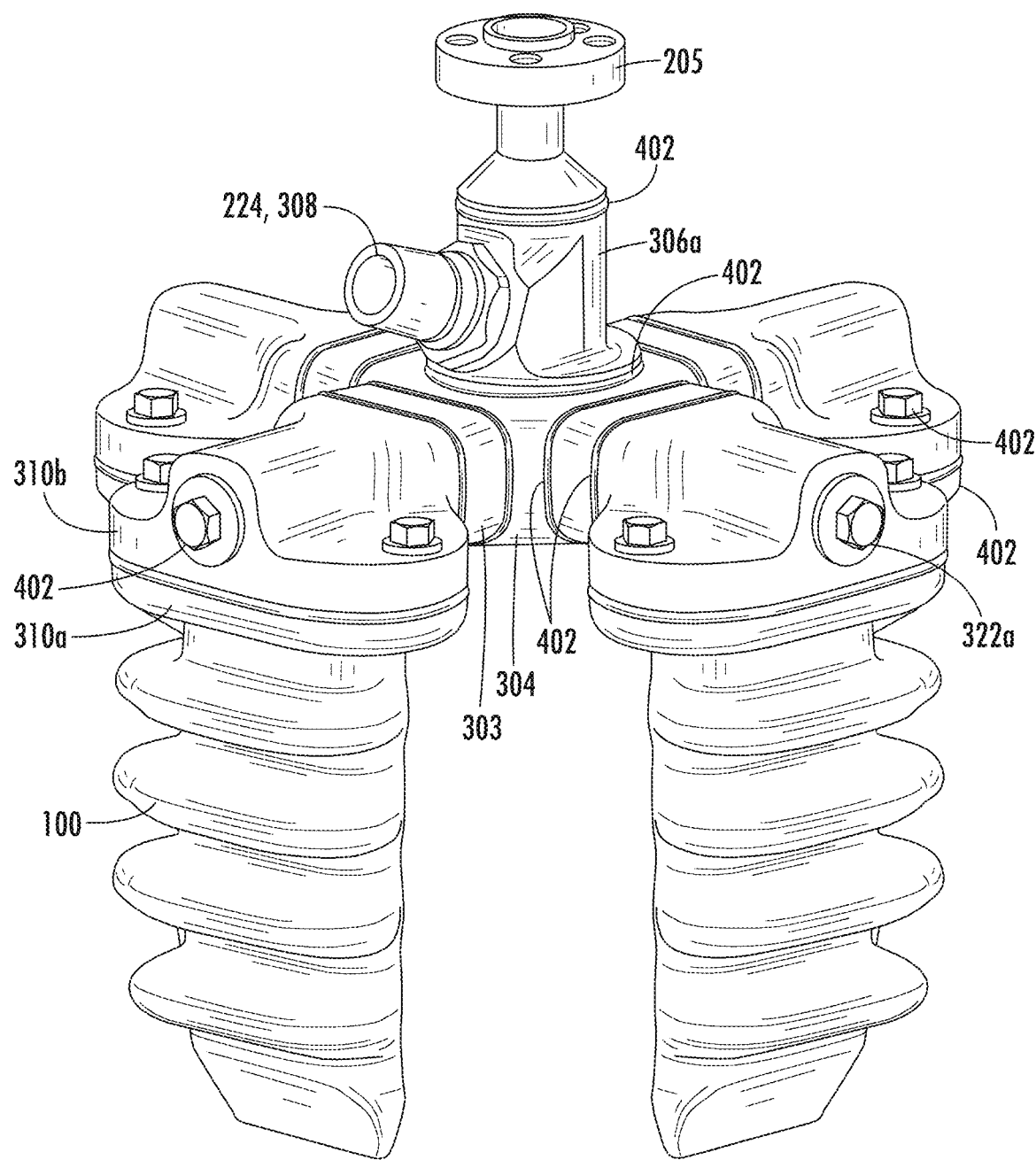
FIG. 4B is a perspective view of a conceptually similar field-assembled soft robotic gripper to that of FIG. 4A.

FIG. 4A shows a schematic side view of a soft robotic gripper that includes provisions for lower weight, less mass toward the perimeter, and is structured for food contact sealing and other requirements. As shown in FIG. 4A, the soft robotic gripper includes component parts capable of being assembled in the field at the terminus of an industrial robot arm 206 for providing adaptive gripping of an object, such as a food product. FIG. 4B is a perspective view of a conceptually similar field-assembled soft robotic gripper to that of FIG. 4A, and FIG. 4C is an exploded perspective view of the field-assembled soft robotic gripper of FIG. 4B, with like-numbered elements and similarly located and configured elements sharing the description of FIG. 4A herein. In the several Figures, radially symmetric, mirrored, or otherwise symmetric elements may not all be labeled with a reference number, and element of identical appearance and location will generally share the descriptions of numbered elements herein.

The soft robotic gripper of FIG. 4A includes a hub 306, including an upper hub 306a and lower hub 306b. The hub 306 is capable of mounting to the terminus of the robotic arm 206, and includes a pneumatic inlet 308 formed therethrough. The pneumatic inlet 308 leads to one or more (e.g., radial) outlets 316, and a fastener or tension anchor 324 adjacent one or more radial outlets 382. In this case the fastener anchor 324 may be, for example, a machine screw tapped hole to match the machine screw bolts or threaded rods described herein as an embodiment of a tension fastener 322a, in other cases or embodiments it may be another anchoring mechanism (a quick-connect, detent, set-screw, loop or hook, bayonet mount, or other mechanical anchor).

The hub 306 is surrounded by a palm 304, having a plenum clearance or cavity formed therein, capable of forming a plenum chamber 384 (in this example an annular one) between the radial outlets 382 of the hub 306 and the palm 304. The palm 304 includes a manifold of (e.g., radial) channels 332 formed therein, capable of facing respective fastener anchor(s) 324 when the plenum chamber 384 is formed (by, e.g., inserting the hub 306 into the palm 304 with the plenum clearance therebetween).

As shown, the gripper system includes a plurality of inflatable fingers 100. Each inflatable finger 100 may be formed as or including an elastomer body which bends under inflation in a first direction (e.g., curling in, in a grasping direction) and, in an ambient air environment, under vacuum in a second direction (e.g., curling out, in a release direction), and a fluid port capable of providing pneumatic inflation and deflation (e.g., when the gripper is assembled at the terminus of a robotic arm 206, with the inflation device 120 connected to the inlet port of the hub 306). The fluid port may be equal to or smaller in cross sectional area than the channels 314 (subtracting the fastener 322a), the plenum chamber 384, and/or the hub inlet 308 and/or tubes 118a.

Each finger 100 is housed and sealed within a finger mount 310, with a rim of the finger 310 being compressible as a pneumatic and/or microbial ingress seal. Accordingly, two or more finger mounts 310 each include a pneumatic passage 380 capable of connecting a respective radial channel 314 of the palm to a respective inflatable finger 100 (and inflatable via the plenum chamber 384 and hub outlet(s) 316).

Figure 10:
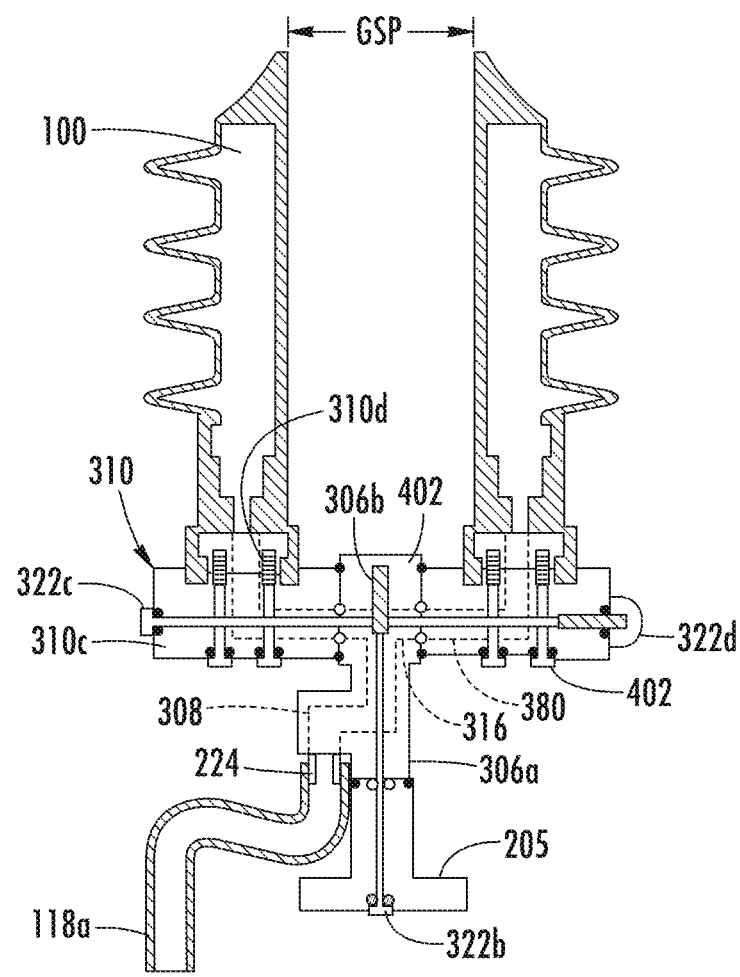
FIG. 10 is a schematic side view of a field-assembled soft robotic gripper similar to that of FIG. 9 having a parallel and bezel-less configuration.

Each finger mount 310 is held in compression to the palm 304 by a tension fastener 322a. Each tension fastener 322a is capable of securing a respective finger mount 310 to the palm 304 (and/or hub 306) by passing through a respective pneumatic passage 380, channel 332 and the plenum chamber 384 and fastening under tension to the fastener anchor 324. As shown, inserted pneumatic, microbial ingress, and/or dual-function seals 402, 404, 406 are thereby compressed between the finger mounts 310 and palm 304. In some configurations, e.g., as shown in FIG. 5B or FIG. 10, a tension fastener 322c may extend between two finger mounts 310 (passing through the hub 306, and/or a palm 304 to a tension anchor/nut 322d on an opposite side of the hub 306), and inserted pneumatic, microbial ingress, and/or dual-function seals 402, 404, 406 may be compressed between the finger mounts 310 and hub 306.

This configuration provides various benefits and advantages. In contrast to the tool configuration shown in FIGS. 1-3, system mass is not increased beyond that necessary for the desired gripper configuration—there is no unused or extra rail mass, no mass needed for adjustments that are not made after the tool is originally configured. In contrast to the tool configuration shown in FIGS. 1-3, the entire tool/gripper can be surface IP67 (or similar) sealed, e.g., no ingress of dust/complete protection against contact (dust tight), as well no ingress of water in harmful quantity under immersion in water up to 1 m, as the inserted microbial ingress, and/or dual-function seals 402, 406 (e.g., O-rings and/or gaskets) are compressed between the hub 306, palm 304, spacers 303, and/or finger mounts 310. Moreover, in contrast to the tool configuration shown in FIGS. 1-3, the entire tool/gripper can be hygienically/sanitarily configured, e.g., meeting various principles for such design, several noted in Table 1. With configurable T-type rails, many of these principles cannot be met.

TABLE 1

Some Sanitary Configuration Principles

| Sanitary Concept | T-rail, adjustable, FIGS. 1-3 | FIGS. 4-15 |
| --- | --- | --- |
| All surfaces accessible for mechanical cleaning/treatment to prevent biofilms formation | No | Yes |
| Horizontal and other surfaces prevent water pooling, are self-draining (angled or convex) | No | Yes |
| Internal corners and angles have a smooth and continuous radius at least ⅛ inch and/or angles of less than 135° | No | Yes |
| Seals prevent the ingress of microorganisms. | No | Yes |
| Smooth surfaces with average roughness or radius of <0.8 μm (approx.. 32 μin) in food contact area | No | Yes |
| No defects, folds, breaks, cracks, crevices, injection-molded seams, or joints, even with material transitions. | No | Yes |
| No holes or depressions. | No | Yes |
| Minimum corner radius at least 3 mm. No corners of 90°. | No | Yes |
| Risk of part loss minimized (avoid external fasteners, lock fasteners) | No | Yes |

In part, the structure described herein, in which the component parts of the gripper are secured to one another by passing the tension fasteners through the pneumatic channels, and/or in which microbial ingress seals surround or line all surface interfaces between hard or rigid parts and are compressed by the tension fasteners 322a-d, permits some of these benefits and advantages.

Optionally, the hub 306 is formed from a metal material, such as stainless steel or aluminum, and the palm and finger mounts have a volumetric mass density less than ½ that of the robot interface of metal material. Almost all plastics and polymers have a volumetric mass density less than ½ of metals and composites, honeycomb, hollow and/or foamed metals may also have a (averaged) volumetric mass density below substantially ½ of that of the hub material. This dens/strong center, less dense perimeter approach permits overall lower mass, higher gripping payloads (heavier gripped objects) and higher translation acceleration, as well as higher angular accelerations, as the peripheral mass and moment of inertia are significantly lower.

Figure 11:
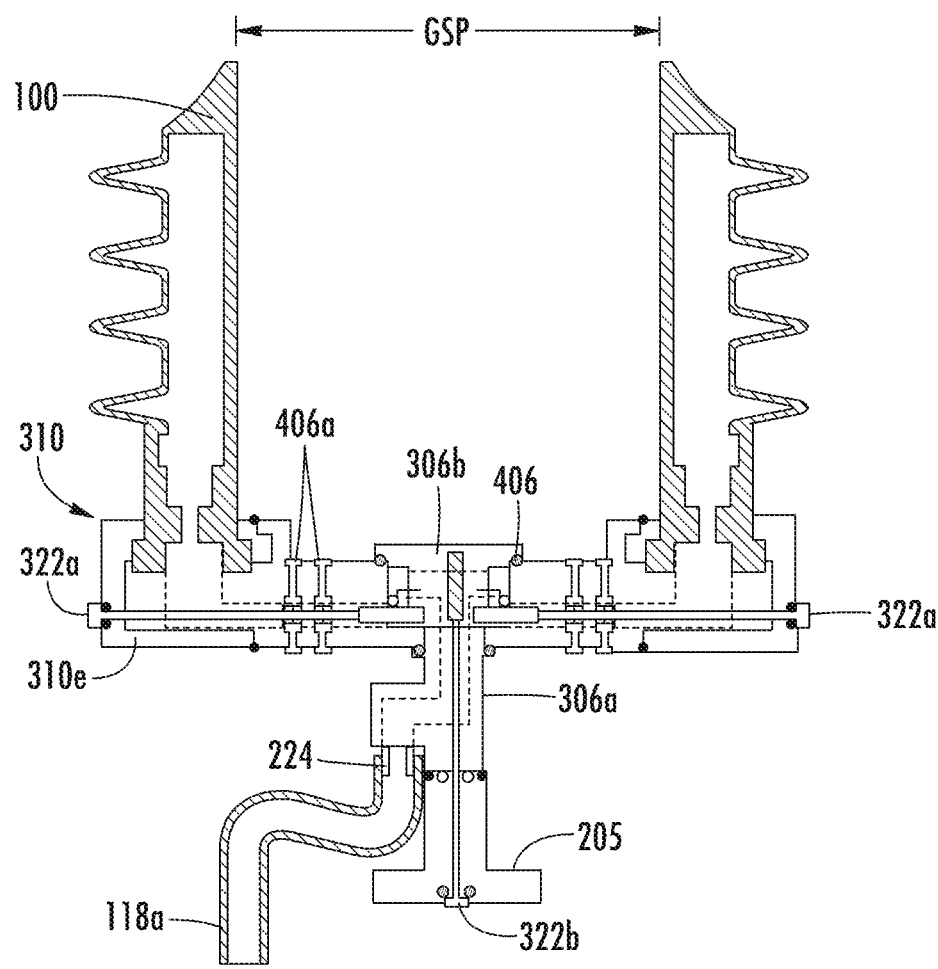
FIG. 11 is a schematic side view of a field-assembled soft robotic gripper similar to that of FIG. 4 having a gasketed configuration.

As noted, and as shown throughout FIGS. 4-13, the gripper may use first pneumatic seals 404, such as pneumatic O-rings, capable of insertion surrounding each matched radial channel 332 and pneumatic passage 380, between the palm 306 and each finger mount 304. These seals or O-rings 404 are compressed to maintain air and vacuum pressure. However, pneumatic seals that are not at an exterior surface of the gripper cannot prevent ingress of fluids and microbes at those surfaces. Accordingly, optionally, the gripper may also include first microbial ingress seals 402 capable of insertion surrounding the pneumatic seal 404 (e.g., in substantially a same plane), at each interface where an outer surface of the palm 304 meets an outer surface of each respective finger mount 310 (or, for example, where spacers 303 meet any of the palm 303, finger mount 301, or hub 306). The microbial ingress seals 401 may be substantially in-plane with and/or parallel with the pneumatic seals 404, and compressed by the same tension fasteners 322a as the pneumatic seals 402. In some cases, a "dual function' seal or O-ring 406 may be located to provide both pneumatic sealing and fluid ingress sealing, when the necessary location of the fluid ingress seal at the outer surface is also suitable as a pneumatic seal. In other cases, as shown in FIG. 11, a dual function gasket 406a may extend from the pneumatic sealing location to the ingress sealing location, in the same plane as each seal. The seals 402, 404, 406, 406a depicted throughout the several Figures are not shown in every location necessary or advantageous for food contact/ingress protection sealing or pneumatic sealing, but in exemplary locations. Locations include: at each common mechanical interface (e.g., between a hub abutting a spacer, a hub abutting a finger mount, a hub abutting a cap; a palm abutting a spacer, a palm abutting a finger mount, a palm abutting a cap a spacer abutting a finger mount, a spacer abutting another spacer or an adapter); between upper hub and palm, between lower hub and palm, between upper hub and arm interface. As used "abutting" does not exclude the engagement of the common mechanical interfaces via the male/female plugs.

Optionally, the hub 306 is formed as a lower hub 306b including the (one or more, e.g., radial) outlets 316 and the (one or more) fastener anchors 324, and an upper hub 306a including the pneumatic inlet 308, and as shown in FIGS. 3-13, wherein the lower hub 306b and upper hub 306a are capable of sandwiching the palm 304 therebetween (e.g., in compression, held by a tension fastener 322b, to compress/seal pneumatic seals 404, ingress seals 402, and dual function seals 406) to couple or connect the air path between the radial outlets 316 and the pneumatic inlet 308, each of the upper hub 306a and lower hub 306b capable of sealing to the palm 304. As shown in the several Figures, the pneumatic inlet 308 is schematically depicted as a straight path with 90 degree corners, but the inlet 308 may be angularly merged into the path of a channel 308 along the length of the upper hub 306a. Pneumatic seals or O-rings may also or alternatively be arranged in concentric locations, sealing between a cylindrical perimeter of the upper or lower hub 306a, 306b and a cylindrical inner wall of the palm 304.

Optionally, the soft robotic gripper may also include second pneumatic seals 404 capable of insertion surrounding each of the upper and lower hubs 306a, 306b and capable of pneumatically sealing the upper hub and lower hub 306a, 306b to the palm 304; and/or second microbial ingress seals 402 capable of insertion at each interface where an outer surface of the palm 304 meets an outer surface of each of the respective upper hub 306a and lower hub 306b.

Further optionally, as shown, the fastener anchors 324 may each include a tapped hole formed in the hub 306, and the tension fasteners 322a may each include an elongated member having machine screw threads, mating to a respective tapped hole. The elongated member may be a partially or entirely threaded rod, or may be a bolt.

Still further optionally, product contact areas of the finger 100 may be as smooth or smoother than substantially 32 microinch average roughness (Ra) and non product contact areas of the gripper may be as smooth or smoother than substantially than approximately 125 microinch (Ra). These are suitable for food contact or adjacent areas of function.

While the foregoing description applies generally to, e.g., each of FIGS. 4-13, to both radial (circular) and parallel configurations, the palm 304 may be more optional in the case of a parallel arrangement such as is shown in FIGS. 5B, 5C, 7D-7F, and 10. For example, the grippers of these Figures, in addition to optional configurations of the remaining Figures, show a soft robotic gripper having component parts capable of being assembled in the field at the terminus of a robot arm 206, and providing adaptive gripping of a product. As shown in, e.g., FIG. 10, the hub 306a-306b may be capable of mounting to the terminus of the robotic arm 206, e.g., via an adapter or arm interface 205. The hub 306a-306b has a pneumatic inlet 308 formed therethrough leading to a plenum (tube) 384a interconnecting outlets 316. As previously described, the fingers 100 are sealed into the finger mounts 310, and the pneumatic passages 360 capable of pneumatically coupling (e.g., or physically connecting) an outlet 316 of the hub 306a-306b to a respective inflatable finger 100. The tension fasteners 322d (optionally 322a) are arranged to be capable of securing a finger mount 310 to the hub 306a-306b by passing through a respective pneumatic passage 380 of the finger mount and an outlet 316 of the hub 306a-306b, and fastening under tension from the finger mount 310 and in a direction of the hub 306a-306b.

In one example, as shown in FIGS. 5B, 5C, 7D-7F, and 10, opposed parallel finger mounts 310 may be joined by a tension fastener 322c extending from one finger mount 310 to the opposing one, a (sealed, capped nut) fastener anchor 322d being located in one of the opposing finger mounts 310. Each fastener 322c is capable of securing a pair of finger mounts 310, 310 to the hub 306 by passing through respective pneumatic passages 380 of the pair of finger mounts 310, 310 and a pair of outlets 316, 316 of the hub 306, and fastening under tension from one finger mount to a remaining finger mount (compressing the hub 306 and inserted pneumatic, microbial ingress, and/or dual-function seals 402, 404, 406 therebetween).

With this general structure, as shared with the remaining Figures, a palm 304 may be capable of forming a plenum chamber 384 between the outlets of the hub 306a-306b and the palm 304, and a manifold of channels 332 leading from the palm 304, wherein each pneumatic passage 380 of each finger mount 310 is capable of connecting a respective channel 332 of the palm 304 to a respective inflatable finger 100. As noted, the hub 306a-306b may have a plurality of fastener anchors 324 adjacent the outlets 316, to which the tension fasteners 322a are capable of being secured.

FIG. 4A, as a schematic side view, may represent radial arrangements of fingers 100 (e.g., 2 or higher) as well as parallel arrangements of fingers 100. FIGS. 5-14 depict alternatives, variations, and schematics for further explanation of the principles of the invention as discussed with reference to FIGS. 1-4.

Figure 5A:
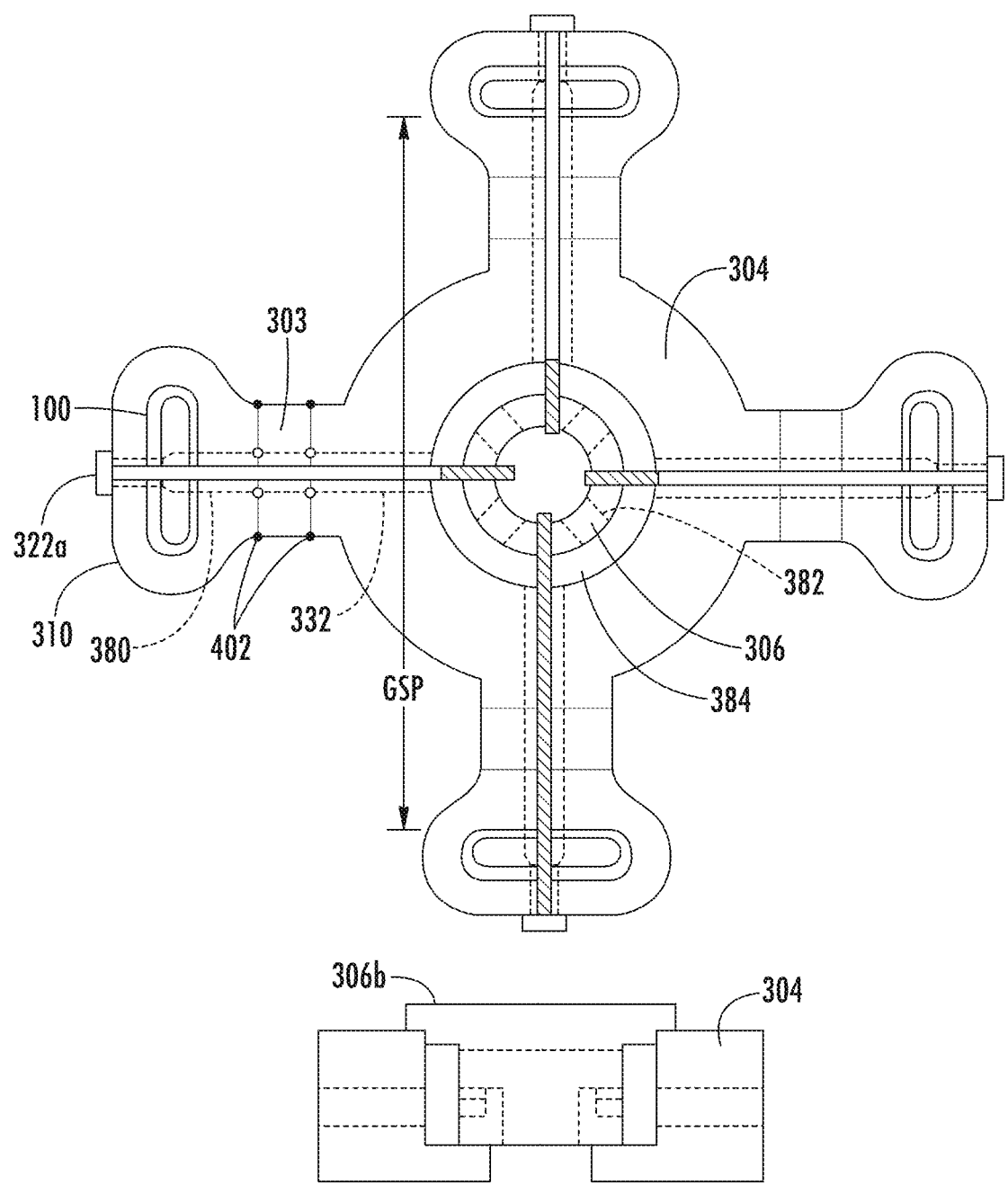
FIG. 5A is a schematic top view of a four-finger radial version of the construction shown in FIG. 4.
Figure 5B:
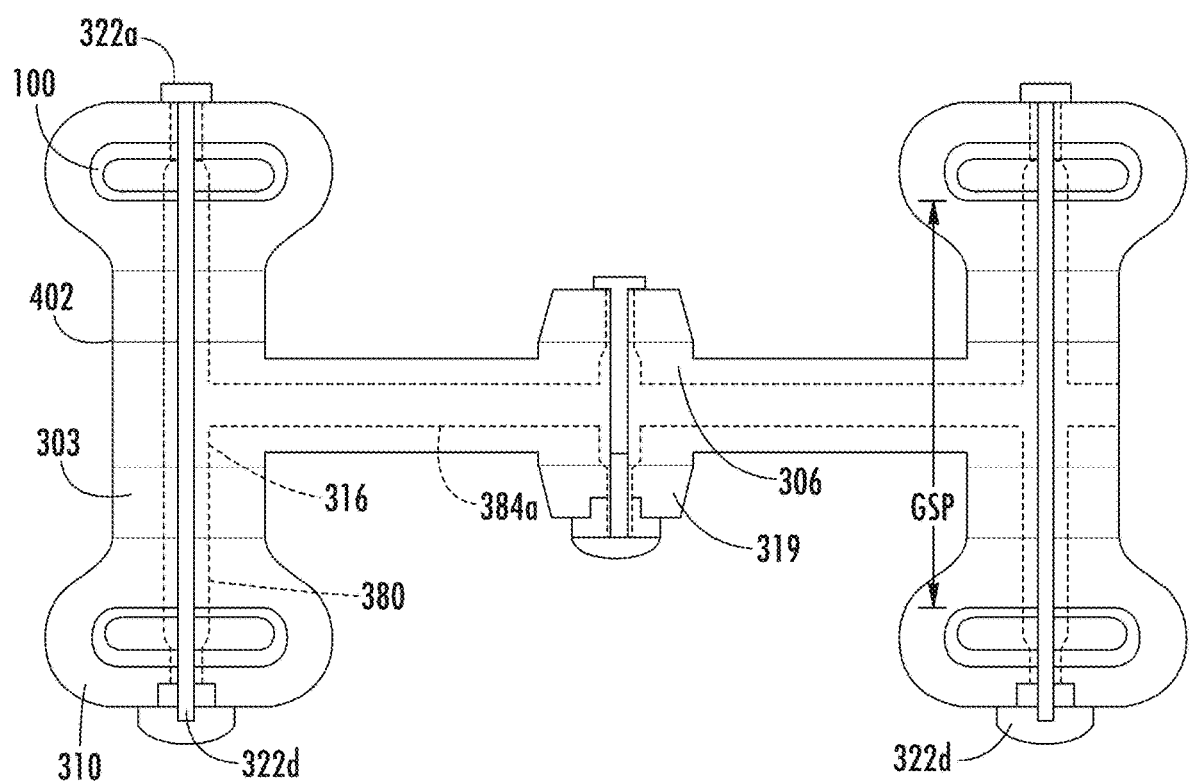
FIG. 5B is a schematic top view of a four-finger parallel version of the construction shown in FIG. 10.

FIG. 5A is a schematic top view of a four-finger radial version of the construction shown in FIG. 4A. As shown, the hub 306 positions and arranges the fingers 100 in the selected radial distribution, distributes air pressure and/or vacuum from the upper hub 306a via outlets 316, 382 through optional plenum 384 to channels 380 through optional palm 304, optional spacers 303, and passages in the finger mounts 310 to fingers 100. The hub 306 also includes fastener anchors 324 that anchors tension fasteners 322a passing through the pneumatic channels and passages. Pneumatic seals 304 and microbial ingress seals 302 are radially compressed by the fasteners 322a. In this configuration, the palm 304 provides a location for the plenum 384 and sufficient spacing from the central axis to mount the finger mounts 310 adjacent to one another along a circle without interference.

FIG. 5B is a schematic top view of a four-finger parallel version of the construction shown in FIG. 10 (mounted using a hub 306 or hub/palm having six common mechanical interfaces). As shown, the hub 306 positions and arranges the fingers 100 in the selected parallel distribution, distributes air pressure and/or vacuum from the upper hub 306a via outlets 316, 380 through optional plenum 384 to channels 380 and through optional spacers 303, and passages in the finger mounts 310 to fingers 100. The fingers 310 receive fastener anchors 322d that anchors tension fasteners 322c passing through the pneumatic channels and passages. Pneumatic seals 304 and microbial ingress seals 302 are in-line compressed by the fasteners 322a. In this configuration, the hub 306 and palm 304 may be considered unitary, or the hub 306 taking up functions of the palm 304, and provide a location for the plenum 384 and sufficient spacing along the parallel axis to mount the finger mounts 310 adjacent to one another along a line without interference.

FIG. 5C is a schematic top view of a four-interface parallel configuration similar to that of FIG. 5B, and FIG. 5D is a schematic top view of a four-interface radial configuration similar to that of FIG. 5A, both FIG. 5C and FIG. 5D highlighting the common mechanical interfaces 808. Optionally, as shown in FIGS. 5C and 5D, the palm 304 is matched to the finger mounts 310 via a plurality of common mechanical interfaces 808 matching the (e.g., radial) channels 332 to the pneumatic passages 380 (optionally via spacers 303, which have matching or complementary interfaces). FIG. 5C shows a configuration of a "parallel" hub 306, combined with common mechanical interfaces 808, each with a male and female matching or complementary configuration, each with an air passage 380a therethrough (optionally surrounded by a pneumatically sealing O-ring 404). The male and female sides of the interface 808 may be manufactured on either side of any matching pair of components, so long as the different desired configurations may be assembled. FIG. 5C schematically shows a female-male mount-to-hub configuration and a parallel hub, and FIG. 5D schematically shows a male-male mount-to-palm configuration and a radial hub, but these different configurations may be used alternatively and interchangeably with parallel or radial hubs/palms, and even with one another, as shown.

In each of FIGS. 5C and 5D, the mechanical interface configuration is shown schematically next to the depicted part in dotted lines, with dotted lead lines showing the location of an interface. FIG. 5C shows a configuration in which the palm 304 and the finger mounts 310 each includes male "plugs" or protrusions, in which case the spacers 303 may be extruded prism shapes, having a female "plug" or receptacles on both sides of the spacer. In examples, the finger mounts 310 do not interface directly with the palm 304, but rather use a minimum width spacer 303 or "adapter".

FIG. 5D shows a configuration in which the palm 304 includes male "plugs" but the finger mounts 310 each includes female "plugs", in which case the spacers 303 each have a male and female "plug" on opposite sides of the spacer. The finger mounts 310 may interface directly with the palm 304, without a minimum width spacer. The spacers may be daisy-chained (in which case so would be the inserted, compressed pneumatic, microbial ingress, and/or dual-function seals 402, 404, 406) An extrudable prism shape spacer 303 may also be used with a male-male adapter as shown.

Accordingly, optionally, the gripper is capable of being assembled to include one or more spacers 303, each spacer 303 having a pneumatic interface (808, including passage 380a) bridging between a respective radial channel 332 and pneumatic passage 380. The respective tension fasteners 332a pass through the pneumatic interface (808, 380a) to secure each respective finger mount 310 to the palm 304 via the at least one spacer 303, intervening between. Inserted pneumatic, microbial ingress, and/or dual-function seals 402, 404, 406 are compressed between the component parts.

Figure 6B:
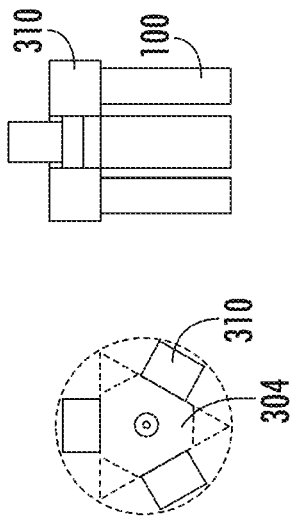
FIGS. 6A through 6D show schematic top views of different exemplary radial arrangements of palm, spacers, and finger mounts.
Figure 6D:
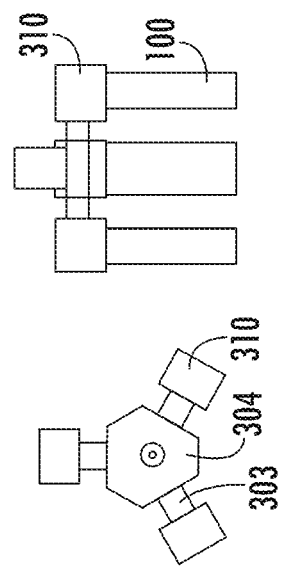
Figure 6A:
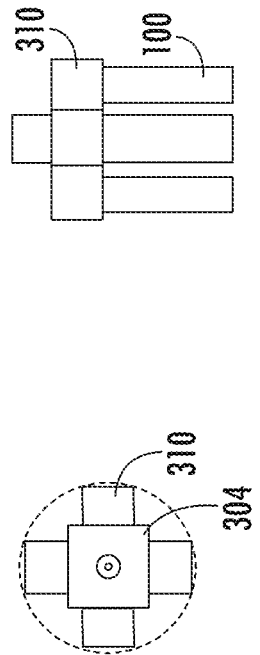
Figure 6C:
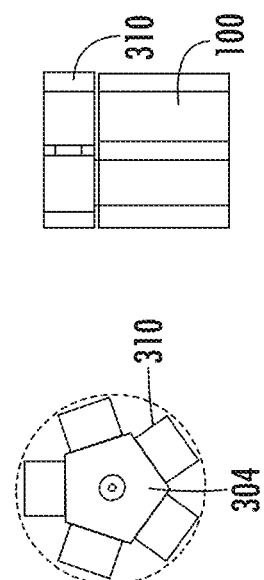

FIGS. 6A through 6D show schematic top views of different exemplary radial arrangements of palm 304, spacers 303, and finger mounts 310. For example, FIG. 6A shows a radial or circular four finger arrangement without spacers, where the finger mounts are located at 90 degree angular intervals and compressed directly to the palm. FIG. 6B shows a radial or circular three finger arrangement without spacers, where the finger mounts are located at 90 degree angular intervals and compressed directly to the palm. FIG. 6C shows a radial or circular five finger arrangement without spacers, where the finger mounts are located at 72 degree angular intervals and compressed directly to the palm. FIG. 6D shows a radial or circular four finger arrangement with spacers 303, where the finger mounts are located at 90 degree angular intervals and spaced from the hub by spacers as well compressed with the spacers to the palm.

Figure 7A:
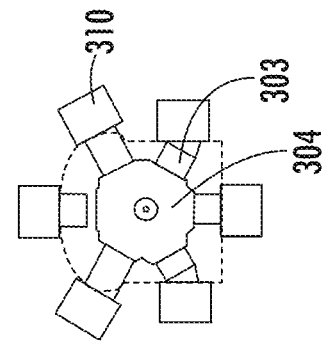
FIGS. 7A through 7C show additional schematic top views of different exemplary radial arrangements of palm, spacers, and finger mounts.
Figure 7B:
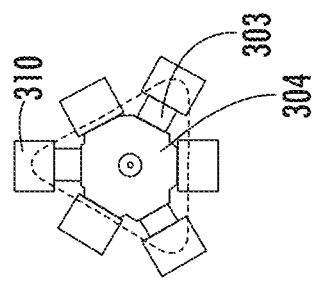
Figure 7C:
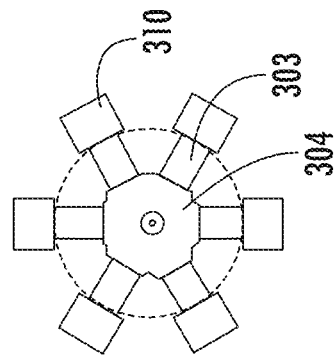

FIGS. 7A through 7C show additional schematic top views of different exemplary radial arrangements of hub 306, palm 304, spacers 303, and finger mounts 310. For example, FIG. 7A shows a radial or circular six finger arrangement with spacers 303, where the finger mounts are located at 60 degree angular intervals and spaced from the hub by spacers as well compressed with the spacers to the palm. For example, FIG. 7B shows a radial or circular six finger arrangement with staggered or different length spacers 303, where the finger mounts are located at 60 degree angular intervals, but spaced at different distances the hub by spacers as well compressed with the spacers to the palm. It may be noted that this arrangement can hold a rounded triangle shape (dashed line) at six points of contact.

As an example of asymmetric arrangement, FIG. 7C shows a radial or circular six finger arrangement with both different length and bent (or stacked straight and angled) spacers, suitable for holding an arbitrary form (in this case, as an example, the form of a slice of bread having a square portion and 'muffin' top). It may be noted that this arrangement holds the arbitrary bread-slice form at six points of contact—which reduces the contact forces necessary to grasp and pick this shape by distributing lifting about the perimeter. The bent or angled spacers and attached finger mounts may be arranged to compress the pneumatic and/or microbial ingress seals via the tension fasteners 322a as discussed herein, e.g., by arranging the pneumatic channel and interface surfaces at an angle to the finger gripping surface, rather than perpendicular to it.

Figure 8A:
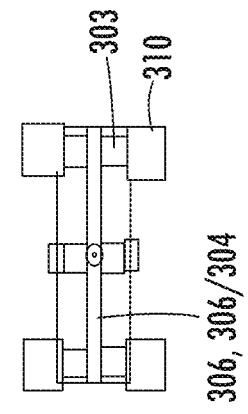
FIGS. 8A through 8C show additional schematic top views of different exemplary parallel arrangements of hub or hub/palm, spacers, and finger mounts.
Figure 8B:
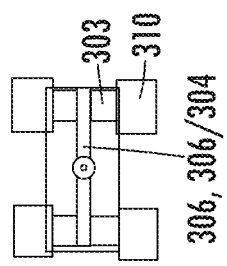
Figure 8C:
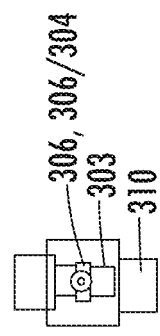

For example, FIG. 8A shows a parallel two finger arrangement with spacers, where the finger mounts are located at 180 degree angular intervals and the spacers and finger mounts are both compressed to the hub 306 or combined hub/palm. FIG. 8B shows a parallel four finger arrangement with spacers, where two pairs of finger mounts are located at 180 degree angular intervals along a line, and the spacers and finger mounts are both compressed to the hub 306 or combined hub/palm. FIG. 8C shows a parallel four finger arrangement with spacers, using a six-interface hub/palm, where two pairs of finger mounts are located at 180 degree angular intervals along a line (but farther apart than with FIG. 8B), and the spacers and finger mounts are both compressed to the hub 306 or combined hub/palm. End caps seal the unused interfaces in the middle of the hub/palm and are secured and compress seals with in the same manner as the finger mounts.

Figure 9:
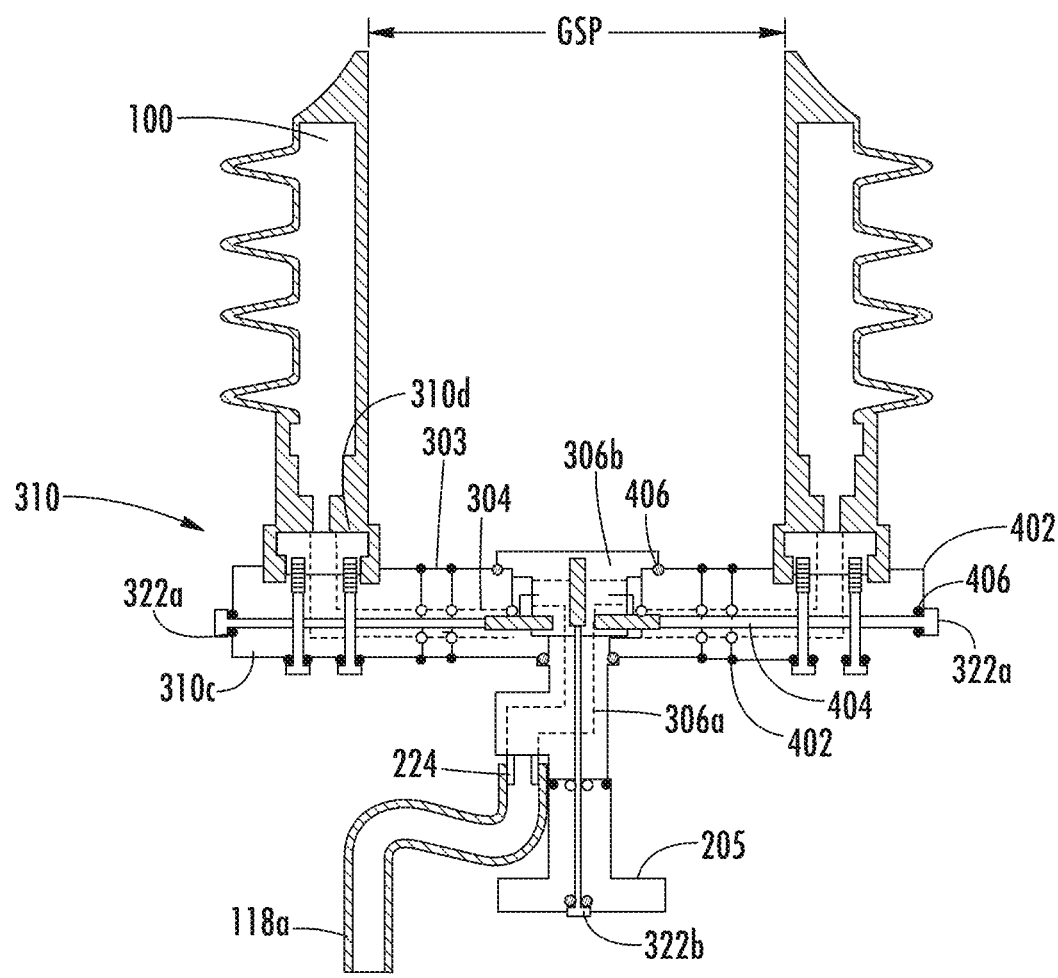
FIG. 9 is a schematic side view of a field-assembled soft robotic gripper similar to that of FIG. 4 having a radial and bezel-less configuration.

FIG. 9 shows a configuration similar to that of FIG. 4A, except that where FIG. 4A shows a finger mount 310 including a finger mount body 310b to which a plate-like bezel 310a is compressed by bezel fasteners acting along the same direction as the compression, sealing the elastomer finger 100 rim by compression, FIG. 9 shows a 'bezel-less' form where a chock 314-D is arranged with the finger body, and is secured by chock fasteners which compress the elastomer finger 100 rim. In each of the bezel 310a forms and bezel-less form, the inner perimeter of the finger mount 310 surrounding the bottom of the finger 100 at location 311 may be of slightly smaller inner diameter than the outer perimeter of the finger 100, compressing and sealing where the finger 100 surface meets the finger mount 310 surface. In the bezel-less chock 314-D form, the inner perimeter of the finger mount surrounding the bottom of the finger 100 may be substantially the same size as the outer perimeter of the finger 100, with the outer perimeter of the chock arranged (sized, or angled) to compress the finger 100 against the inner perimeter of the finger mount 310. The bezel-less form maybe more advantageous for food contact situations, where having the fasteners outside the direct food area, as well as retained in a manner where loosening fasteners are less likely to fall out, is helpful.

FIG. 10 shows a configuration similar to that of FIG. 9, except that the hub 306a-306b may be used as alone or a combined hub-palm in a parallel configuration (or a two-finger radial configuration), with spacers and/or finger mounts 310 being compressed to the hub or hub-palm. A tension fastener 322c may extend between two finger mounts 310 (passing through the hub 306, and/or a palm 304 to a tension anchor/nut 322d on an opposite side of the hub 306), and inserted pneumatic, microbial ingress, and/or dual-function seals 402, 404, 406 may be compressed between the finger mounts 310 and hub 306. No spacers are shown in FIG. 10, but spacers 303 may be used in this configuration as discussed herein.

FIG. 11 shows a configuration similar to that of FIG. 4A, except that certain of the microbial ingress seals 402 and pneumatic seals that are in-plane are combined into a dual function gasket 406a form, the gasket 406a having inner features that seal pneumatically and outer features that provide microbial ingress sealing. The gasket 406a is compressed in the same manner as the independent seals 402, 404, 406 discussed herein.

Figure 12:
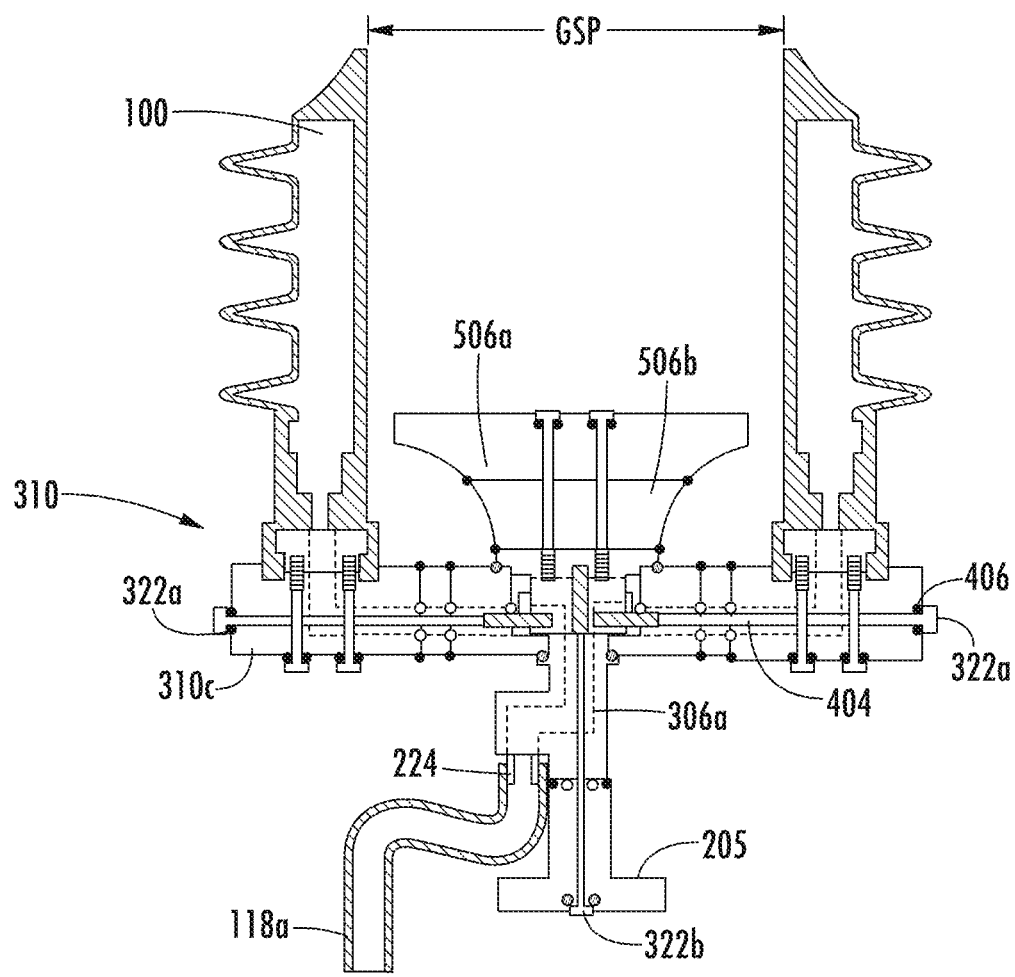
FIG. 12 is a schematic side view of a field-assembled soft robotic gripper similar to that of FIG. 9 having a palm or bumper plate.

FIG. 12 shows a configuration similar to that of FIG. 9, except for the provision of a palm or bumper plate 506a that is sealed vs. microbial ingress (via O-rings) in the same manner as the spacers 303. The bumper plate 506a may conform to the sanitary guidelines discussed in Table 1. As shown in FIG. 12, the gripper may include a palm plate 506a against which a food object may be held by the fingers 100. The palm plate 506a may be spaced from the hub 306 and/or palm 304 by a spacer 506b. Generally, although not exclusively, as used herein, the terms ""base plate", "palm plate", "bumper plate", or "hub plate" may refer to a reference surface adjacent two or more soft robotic members against which the soft robotic member may in some cases hold a work object, e.g., when curled in a "closing" direction, and from which the grip of the soft robotic members 100 on the work object may be released, e.g., when the soft robotic members are curled or recurled in an "opening" direction. The use of "plate" does not suggest that the member is fully planar—"plates", unless otherwise described, may have surface relief, contour, curves, peaks and valleys, texture, or the like—a "plate", unless otherwise described, describes a member fitting within a plate-like envelope or aspect ratio.

Figure 13:
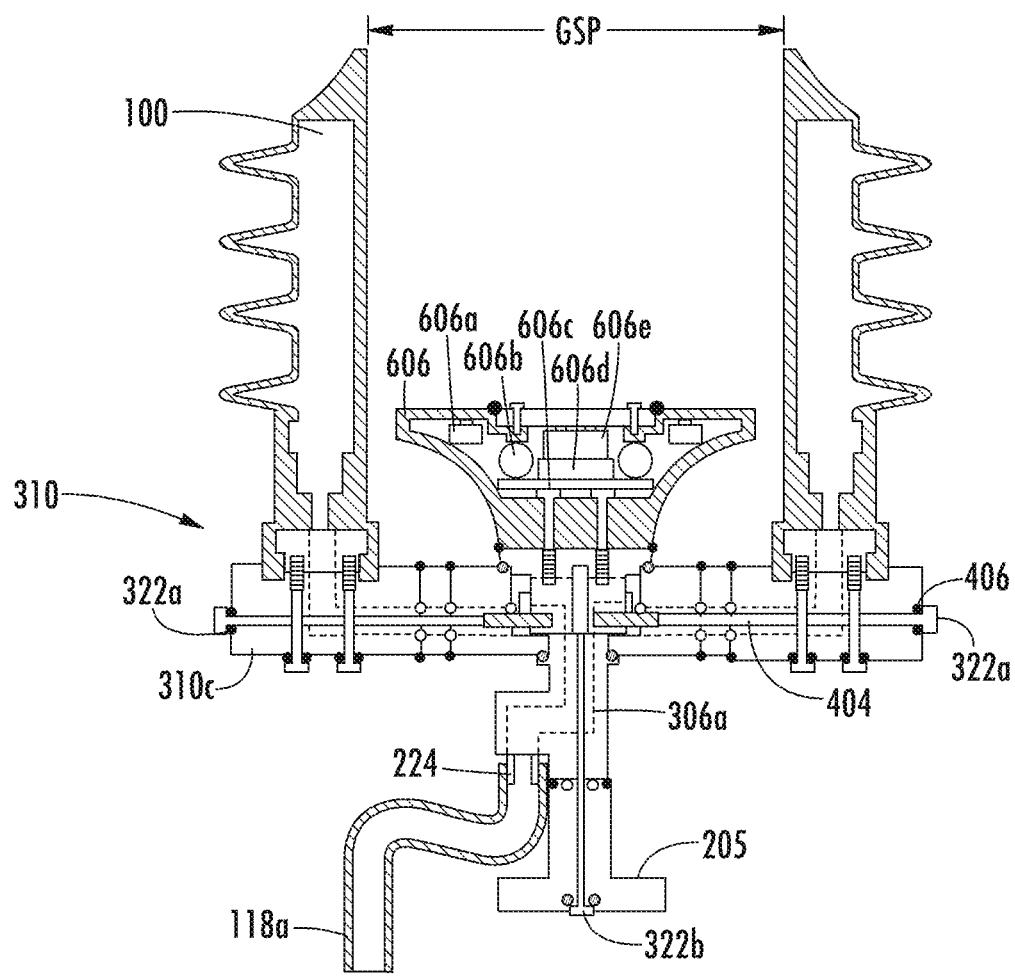
FIG. 13 is a schematic side view of a field-assembled soft robotic gripper similar to that of FIG. 9 having a sensor package.

FIG. 13 shows a configuration similar to that of FIG. 9 or 12, except for the provision of a sensor housing 606 that may be sealed vs. microbial ingress (via O-rings) in the same manner as the spacers 303 and/or bumper plate 506a. The sensor housing 606 may include illumination 606e (infrared, visible light, UV for fluorescing, and or structured light for ranging), camera(s) 606a (monochrome, color, stereoscopic, RGBD, and/or triangulation, contrast-based, time-of-flight or phase difference ranging), batteries 606b, a sensor package (including, for example, inertial or accelerometer sensors, temperature, angular acceleration or gyroscopes, humidity, gas type, magnetic, capacitive, inductive), and a controller 606c connected to all of the remaining elements as well as to an on-board antenna for communicating wirelessly and externally (e.g., Wi-Fi, Bluetooth, low-power 802.15 PAN, mesh network). The sensor housing may be used to detect relative location or acceleration of the gripper environmental conditions, product conditions, status, or presence; failure modes of the gripper; commercial counts and exceptions. Although the sensor package 606 shown is wireless and battery-powered in view of the availability of long-life wireless "IOT" sensing and the relative ease of sealing an independent housing for food contact, it may also be tethered with power and signal cables (optionally food-contact rated).

Figure 14:
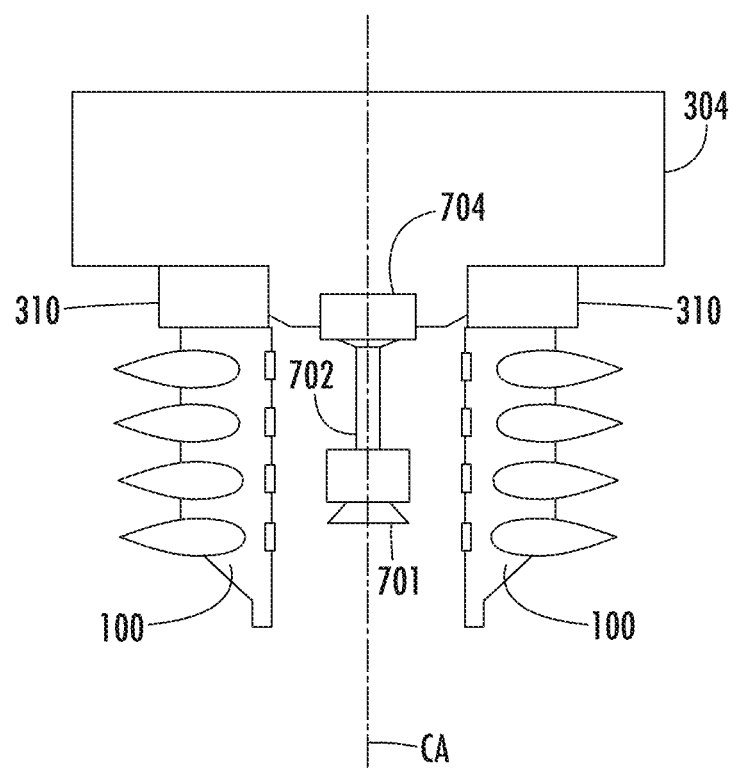
FIG. 14 shows a configuration similar to those of FIGS. 4-13, except including an extendible vacuum cup effector 304 and camera.

FIG. 14 shows a configuration similar to those of FIGS. 4-13, except including an extendible vacuum cup effector 701 and camera. A camera 704 configuration is discussed herein with respect to FIG. 13. FIG. 14 shows a similar system in which an extendible vacuum cup effector 701, extendible via a linear actuator and extension arm 702, is arranged substantially along a center line of the gripper, and in which a camera 704 is similarly arranged substantially along a center line of the gripper. This configuration may be combined with any of the following or preceding examples.

Figure 15A:
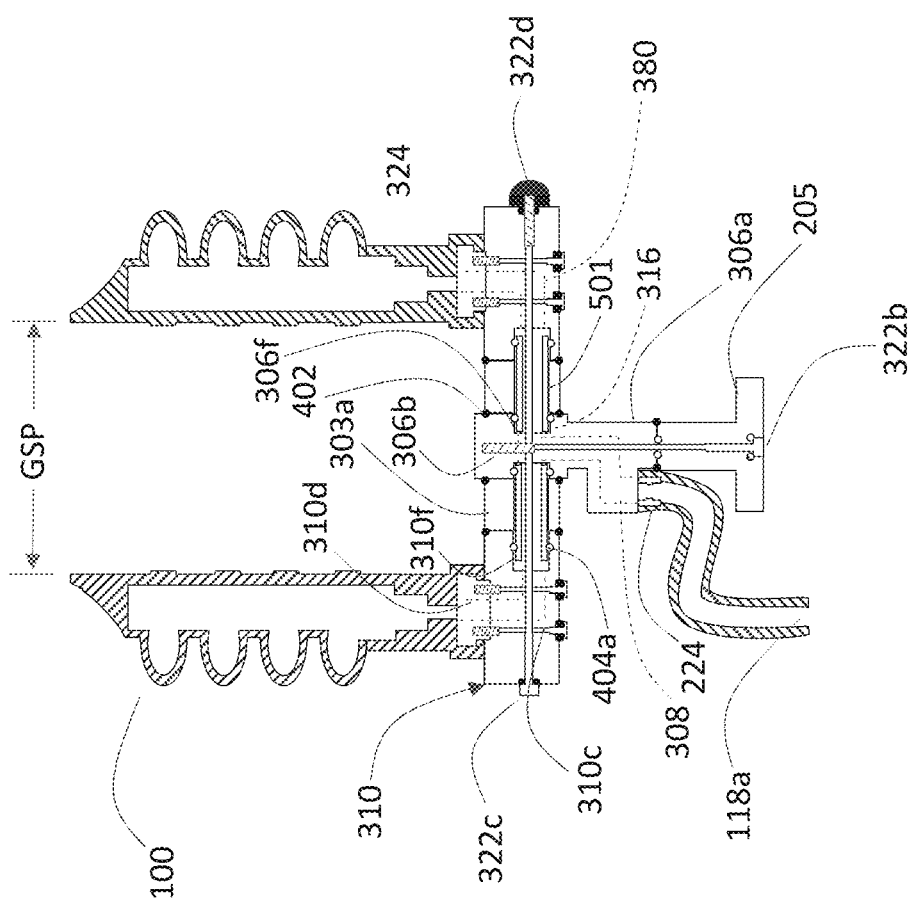
FIG. 15A is a schematic side view of a field-assembled soft robotic gripper similar to that of FIGS. 9 and 10 employing an internal pneumatic coupling with paired radial seals.
Figure 15E:
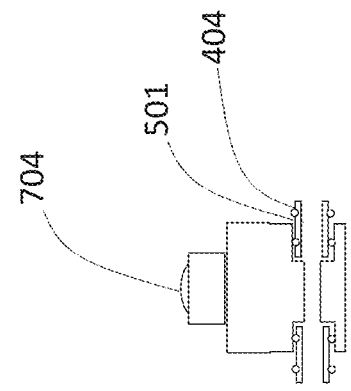
FIG. 15B is a schematic side view of a field-assembled soft robotic gripper similar to that of FIG. 15A, employing an internal pneumatic coupling with paired radial seals in a slidably adjustable configuration.
FIGS. 15C, D, and E are a schematic side views of a field-assembled soft robotic gripper similar to that of FIG. 15A, employing respectively an air puff block, an extensible vacuum cup block, and a camera block together with internal pneumatic couplings with paired radial seals.
Figure 15D:
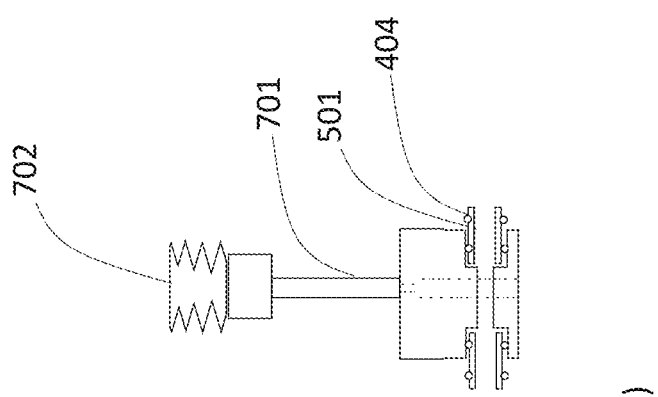

FIG. 15A is a schematic side view of a field-assembled soft robotic gripper similar to that of FIGS. 9 and 10 employing an internal pneumatic coupling with paired radial seals. The gripper(s) and structures shown in FIGS. 15A-22 are contemplated to be used together with the preceding description and disclosure herein, including but not limited to control structures and acts, motion control, motion structures, robot arms, fasteners, and interfaces.

In contrast to FIGS. 9 and 10, the gripper shown in FIG. 15A employs a tubular coupling 501 having radial pneumatic seals, e.g., in the form of circumferential O-rings 404a. The tubular coupling is accepted into a receiving inset 310f on the finger mount 310 side, and a corresponding receiving inset 306f of the hub 306a-306b side. As shown, spacers 303a may include a passage through which the tubular coupling 501 passes, and the spacers 303a may be sealed for microbial ingress via seals 402 as previously described. The spacers 303a and/or finger mounts 310 may be compressed to the hub or hub-palm via a tension fastener 322c that may extend between two finger mounts 310 (passing through the hub 306, and/or a palm 304 to a tension anchor/nut 322d on an opposite side of the hub 306). Inserted microbial ingress, and/or dual-function seals 402, 406 may be compressed between the finger mounts 310 and hub 306. The circumferential seals 404a are not compressed by the tension fastener 322c, but by the inner cylindrical wall of the receiving insets 310f and 306f The tubular coupling 501 may be provided in various lengths, e.g., slightly longer than various lengths of spacers 303a, to match spacer lengths 303a. The end faces of the tubular coupling 501 need not be completely finished, as the pneumatic sealing is provided about the tube outer wall rather than the end face(s). Accordingly, the tube coupling 501 may be cut to length on site. As shown, the tube coupling 501 is shorter than the combined length of the receiving inserts 310f, 306f and the internal passage of the spacer 303a.

The pneumatic coupling 501 or plug 501, with two radial seals 404a in series, may improve seal quality and repeatability vs. some forms of face sealing. As shown the outer perimeter of the finger module 310 may be ingress sealed to achieve a high or food-grade "IP" (ingress protection) rating. By controlling the tolerance on the inner cylindrical wall of the receiving insets 310f, 306f, the outer wall diameter of the tube coupling 501, and the O-ring seals 404a, the pressure retained by the seals 404a is not affected by the compression of the tension fastener 322c, and may be well controlled for actuator cycle life, pneumatic seal quality, and ingress protection via the seals 402. In addition, these tolerances may be combined among various parts manufactured with some variability to meet an overall tolerance.

FIG. 15B is a schematic side view of a field-assembled soft robotic gripper similar to that of FIG. 15A, employing an internal pneumatic coupling with paired radial seals in a slidably adjustable configuration. As shown in FIG. 15B, the receiving inlets 310f (on the finger mount 310 side) and 306f (on the palm 304 and/or hub 306 side) are sufficiently deep to receive the coupling 501 with some clearance at each end. A connecting plate 309 connects the finger mount 310 and hub 306b or palm 304. A groove 309a within the plate 309 sets and adjustment range and the plate 309 slides via the groove 309a relative to a fastener 322, and permits the finger mount 310 to be moved in a limited range, guided, relative to the hub 306b or palm 304. In all locations, the dual radial seals 404a maintain the relative inner and outer cylindrical wall diameters and concentricity between the coupling 501 and the receiving inlets 310f and 306f, and the pneumatic sealing among the channels 316 (hub), 314 (palm), and 380 (spacer or finger mount).

The adjustability of the arrangement in FIG. 15B is suitable for EOATs that may benefit from fine tuning for finger 100 position between the hub 306 or palm 304 and the finger mount 310 (or "manifold"). A slide type element 309a provides linear motion and position locking via fastener 322. The pneumatic coupling 501 may itself move or slide. As shown, the plate 309 connects to the finger base 310b, but alternatively the plate 309 may connect to a bezel 310a. The two designs may eliminate tubing or fitting at each finger and allow for central air distribution.

Alternatively, the adjustable arrangement may use spacers or adjustment add-ons similar to spacers 303f-f at the end of a coupling 501 or extended reach coupling 501 to adjust distances. Further alternatively, the adjustable arrangement may use a split clamp (which may be tightened to secure a distance) upon the finger mount 301 accepting an adjustment spoke or shaft extending from the hub 306 or palm 304. The radial sealing coupling between the finger mount 310 and hub 306 or palm 304 allows for actuator position adjustments. Because the sealing is radial, by locking/unlocking a clamping element, the finger mount 310 may be repositioned without losing the pneumatic seal. The repositioning may be done dynamically during a pick operation, or as part of a multi-size kit for varying product. Eliminating exposed tubing and fittings using the sealing structures disclosed herein may permit a high sanitary application for the adjustable arrangement.

Figure 15C:
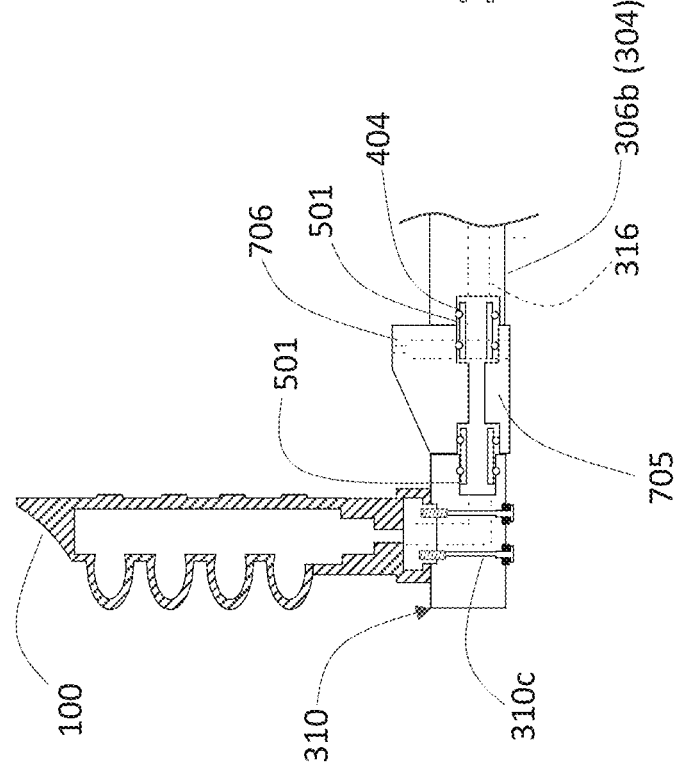

FIGS. 15C, D, and E are schematic side views of a field-assembled soft robotic gripper similar to that of FIG. 15A, employing respectively an air puff block, an extensible vacuum cup block, and a sensor block together with internal pneumatic couplings with paired radial seals. As shown, an add-on air puff block 705 can route the coupling 501 through an internal channel as well as a second source of air via internal passages to a nozzle 706. The second source of pulsed air can be used for part blow off (particulates, moisture, extra parts, etc.) or in finger cleaning in sustained or intermittent air blasts.

Further, as shown, an add-on suction cup block can add an suction cup 702 connected to a suction supply and provided with an independent extensible linear actuator 701 to assist with picking packed objects. Still further, an add-on sensor block can similarly route the coupling 501 through an internal channel and wiring and circuits internally, and can be used for industrial sensors 704 such as photo-electric, capacitance, camera, range finder, etc. to provide grip detection, part present detection, etc.

FIGS. 16A, 16B, 16C, and 16D are schematic side views of a variety of spacers and pneumatic couplings used in FIGS. 1-15, employing respectively a straight air passage, a filter, a flow constriction, and vibration baffles or damping. In FIGS. 16, 17, and 19, "SIDE" indicates a schematic side view, "SIDE-X" indicates a side view in schematic cross-section, and "END" indicates an end view of an adjacent "SIDE" or "SIDE-X" view.

As shown in FIGS. 16A-16D, one role of the spacer 303 or tubular coupling 501 is to permit finger mounts 310 to be connected to a palm 304 optionally at different distances, and optionally in a manner that permits the same fastener(s) to secure and compress both pneumatic seals 404, 404a and ingress seals 402. Each of the spacer 303 or coupling 501 may act as a channel member including a pneumatic channel capable of connecting the pneumatic passage through the finger mount (or another spacer) and a respective outlet from the hub and/or palm (or another spacer), the pneumatic channel surrounded by the two compressible pneumatic seals 404, 404a.

As shown in FIG. 16A, air channels within coupling 501 and spacer 303f-f may pneumatically seal and route air between the palm 304 (or hub 306) and finger mounts 310. As noted herein, the coupling 501 or spacer 303f-f may be of varying lengths to allow for different grip spacing. Each element is sealed with at least one pneumatic seal 404, 404a at each end. In FIG. 16A, the pneumatic radial seals 404a are shown at both ends. For the spacers 303f-f, pneumatic end seal 404 is shown seated in O-ring groove 404b, with ingress seal 402 seated in O-ring groove 402a. Tension fasteners 322 pass through the air channels through the spacer 303f-f, and in one example, through the coupling 501. The female interface 408f may receive a matching male interface 408m (not shown) on the palm 304 and/or finger mount 310.

As shown in FIG. 16B, a filter 601 may be seated within the pneumatic passage through tubular coupling 501 or through spacer(s) 303f-f. Two matched spacers 303f-f are shown here to receive and seal the filter 601 (ingress seals 402 are shown between the matched spacers 303f-f while pneumatic seals 404, are not, but pneumatic seals 404 may be used to seal the flow restrictor 602 as well). In the case of the tubular coupling 501, the filter 601 cleans the air flowing within the air channel, and in the case of the spacer 303f-f, about the air channel fastener 322a. The filter 601 may remove debris in applications where a finger 100 rip or tear may lead to contamination which may damage the control unit 132, As shown in FIG. 16C, a flow restrictor 602 such as a diaphragm or thin disk with aperture may be seated within the pneumatic passage through tubular coupling 501 or through spacer(s) 303f-f. Two matched spacers 303f-f, seals 402, 404, 404a are used here in the same manner as FIG. 16B to receive and seal the flow restrictor 602. In the case of the tubular coupling 501, the flow restrictor 602 throttles flow within the air channel, and in the case of the spacer 303f-f, about the air channel fastener 322a. The flow restrictor 602 may adjust timing for finger 100 opening or closing for multiple fingers 100. For example, in a 6 finger EOAT, the application may need specific fingers 100 to open or close first or last, and inserting one or more flow restrictors 602 may retard the opening or closing of one or more fingers.

As shown in FIG. 16D, a flow dampener 603 such as flexible and/or rigid baffles, and/or other dampener, may be seated within the pneumatic passage through tubular coupling 501 or through spacer(s) 303f-f. Two matched spacers 303f-f, seals 402, 404, 404a are used here in the same manner as FIGS. 16B and 16C. In the case of the tubular coupling 501, the flow dampener 603 throttles flow within the air channel, and in the case of the spacer 303f-f, about the air channel fastener 322a. The flow dampener 603 may reduce bounce or wiggle upon inflation of fingers 100, by changing air path lengths and/or resonant frequencies.

FIGS. 17A, B, and C are schematic side views of a variety of spacers used in FIGS. 1-15, employing respectively a female-female coupling and sealing, a female-male coupling and sealing, and a dual fastener configuration.

As shown in FIG. 17A, air channels within female-female spacer 303f-f may pneumatically seal and route air between the palm 304 (or hub 306) and finger mounts 310. Each element is sealed with at least one pneumatic seal 404 at each end (only one end shown here with seals and corresponding receiving grooves, the structure repeats in series). For the spacers 303f-f, pneumatic end seal 404 is shown seated in O-ring groove 404b, with ingress seal 402 seated in O-ring groove 402a. Tension fasteners 322a pass through the air channels through the spacer 303f-f. The female interface 408f may receive a matching male interface 408m (not shown) on the palm 304 and/or finger mount 310. This spacer 303f-f may be connected end-to-end to another with a male-male adapter.

As shown in FIG. 17A, air channels within female-male spacer 303f-m may pneumatically seal and route air between the palm 304 (or hub 306) and finger mounts 310. Each element is sealed with at least one pneumatic seal 404 at each end (ingress and pneumatic seals and receiving grooves shown at opposing ends here, the structure repeats in series). For the spacers 303f-m, pneumatic end seal 404 is shown seated in O-ring groove 404b, with ingress seal 402 seated in O-ring groove 402a. Tension fasteners 322a pass through the air channels through the spacer 303f-f. Each interface 408f, 408m may receive a matching interface on the palm 304 and/or finger mount 310. This spacer 303f-m may be daisy-chained with other 303f-m spacers.

As shown in FIG. 17C, air channels within female-female spacer 303f-m' may pneumatically seal and route air between the palm 304 (or hub 306) and finger mounts 310. Each element is sealed with at least one pneumatic seal 404 at each end (only one end shown here with seals and corresponding receiving grooves, the structure repeats in series). For the spacers 303f-m', pneumatic end seal 404 is shown seated in O-ring groove 404b, with ingress seal 402 seated in O-ring groove 402a. Paired tension fasteners 322a may pass through the spacer 303f-m adjacent the air channel. The female interface 408f may receive a matching male interface 408m on the palm 304 and/or finger mount 310. This spacer 303f-m may be connected end-to-end to another with a male-male adapter.

FIGS. 18A through 18E are schematic perspective views of a field-assembled soft robotic gripper similar to that of FIGS. 9, 10, 15A and 15B.

FIGS. 18A, 18B, and 18C show shorter, medium, and longer finger mounts 310. In particular, FIG. 18B shows a medium or standard size finger mount 310 in perspective, while FIG. 18D shows the same medium finger mount 310 in cross section. As shown in FIGS. 18B and 18D, and similar to the gripper shown in FIG. 15A, the finger mount 310 employs a tubular coupling 501 having radial pneumatic seals, e.g., in the form of circumferential O-rings 404a. The finger 100 in this example is, as disclosed herein, secured and sealed to the bezel 310a via fasteners 310c. The tubular coupling 501 is accepted into a receiving inset 310f on the finger mount 310 side, and a corresponding receiving inset 306f of the hub 306a-306b side. The finger mounts 310 may be compressed to the hub 306 or hub-palm 306-304 via a tension fastener. Inserted microbial ingress, and/or dual-function seals 402, 406 may be compressed between the finger mounts 310 and hub 306 or hub/palm 306/304. The circumferential seals 404a are not compressed by the tension fastener 323, but by the inner cylindrical wall of the receiving insets 310f and 306f. The tubular coupling 501 may be provided in lengths to match the inner cylindrical walls of the receiving insets 310f and 306f.

As shown in FIG. 18B, the two sides form an interface 808, in which the fasteners 323 may be concentrically arranged within male plugs or pilot protrusions 310d, which permit the finger mount 310 to be held to corresponding female plugs or pilot receptacles 306g (see FIGS. 19A-19C) on the hub 306 or hub/palm 306/304, and which may resist shear between the finger mount 310 and hub/palm 306/304. As shown in FIGS. 18B and 18D, the fingers 100 each include a substantially sinusoidal cross sectional profile 102 on the expanding/compression bellows side, and ridges 101 on the gripping side. Within the ridges 101 may be stiffening bars that resist bowing of the gripping surface about to the curling direction (e.g., maintain the gripping side as a flat but curling surface).

FIGS. 18A and 18C show shorter and longer finger mounts 310, which may be selected alternative to the medium length finger mount 310, or together with the medium length finger mount 310, to field-assemble a gripper of custom shape and size as shown, for example, in FIGS. 20A-20D.

As shown in FIG. 18E, in one embodiment a keel or bumper plate 506c may be provided adjacent the finger 100, mounted upon the finger base 310b. The keel or bumper plate 506c is similar to that discussed with reference to FIG. 12, providing a substantially rigid (not excluding hard rubber or elastomer surface) surface against which a soft article may be pressed by a finger 100. The keel or bumper plate may also be provided to the adjustable embodiment of FIG. 15B, and may be integral to the bezel 310a or finger mount 310b.

FIGS. 19A, B, and C are schematic side views of a variety of interfaces for finger modules used in FIGS. 9, 10, 15A, 15B, and 18A-18E, employing respectively a pneumatic coupling connection with paired radial seals, a direct connection without pneumatic coupling, and a pneumatic coupling with paired radial seals via a spacers.

The interface shown in FIG. 19A is similar to that shown in FIGS. 18A-18E, and employs a tubular coupling 501 having radial pneumatic seals, e.g., in the form of dual circumferential O-rings 404a about the outer wall of the cylindrical tube 501. The tubular coupling is accepted into a receiving inset 310f on the finger mount 310 side, and a corresponding receiving inset 306f of the hub 306a-306b side. As shown, the interface may be sealed against microbial ingress at seals 402 (seated in grooves 402a), and pneumatically sealed at seals 404a, 404a. The pilot protrusion 310d are accepted into receptacles 306g for assembly and resisting shear.

The interface shown in FIG. 19B is a simplified version of that shown in FIG. 19A, lacking the tubular coupling. Instead, pneumatic seals 404 (accepted in groove 404b) surround the pneumatic channels at the interface. As shown, the interface may be sealed against microbial ingress at seals 402 (seated in grooves 402a). The pilot protrusion 310d are accepted into receptacles 306g for assembly and resisting shear.

The interface shown in FIG. 19C is similar to that shown in FIG. 19A, but allows for a surrounding spacer 303f-f tube so that a spacer may be used together with the radial seals 404a and coupling 501, e.g., similar to FIG. 15A. As shown, the spacer 303f-f are formed as a simple, e.g., extruded channel or rectangular tube through which the (long) tubular coupling 501 passes, and the spacers 303a may be sealed for microbial ingress via seals 402, accepted in grooves 402a as previously described. The spacers 303a and/or finger mounts 310 may be compressed to the hub or hub-palm via a tension fastener 323 (in this case, a threaded rod and nut, which may be used in any case herein showing a bolt) that may extend from a finger mounts 310 to a tension anchor 322d on the hub 306 or hub/palm 306/304. The microbial ingress 402 may be compressed between the finger mounts 310 and hub 306. The circumferential seals 404a are not compressed by the tension fastener 323, but by the inner cylindrical wall of the receiving insets 310f and 306f. As shown, the tube coupling 501 is shorter than the combined length of the receiving inserts 310f, 306f and the internal passage of the spacer 303a. The pneumatic coupling 501 with two radial seals 404a in series performs as discussed with respect to FIG. 15A and otherwise herein.

FIGS. 20A through 20D are schematic perspective views of a variety of field-assembled soft robotic grippers, including different size/interface palms and finger modules. FIG. 20A shows a square palm, suitable for two finger lateral or four-finger symmetrical or "circular" tools, combined with shorter and longer finger mounts 310 to form a tool or gripper for picking long articles. FIG. 20B shows a long rectangular palm, suitable for six finger lateral or eight-finger "oval" tools, combined with shorter and longer finger mounts 310 to form a tool or gripper for picking large articles. FIG. 20C shows a medium rectangular palm, suitable for four finger lateral or six-finger "oval" tools, combined with shorter and longer finger mounts 310 in an offset fashion to form an offset tool or gripper for picking articles that may be heavier at one end 9. FIG. 20D shows a stepwise, wide-to-narrow palm, combined with several similar finger mounts 310 in an offset, staggered fashion to form an offset, staggered tool or gripper for picking articles that may be heavier as well as wider at one end. FIG. 20D also shows internal pneumatic routing, represented semi-transparently, which may be used in each case in FIGS. 20A-20D. In each case, unused pneumatic interfaces for finger mounts 310 may be blocked by a "block-off plate" (not shown) instead of a finger mount 310. The block-off plate may have pilots, fasteners and an insert plug sealed with a similar radial seal to block off air flow.

As shown, utilizing single finger modules and a variety of mounting blocks allows rapid field assembly of EOAT ("End Of Arm Tooling") from building blocks. The use of direct surface mounting blocks with air fittings and tubing allows for single finger modules to be fastened to a structural palm to create a custom EOAT together with compatible pedestal or hub designs.

Figure 21:
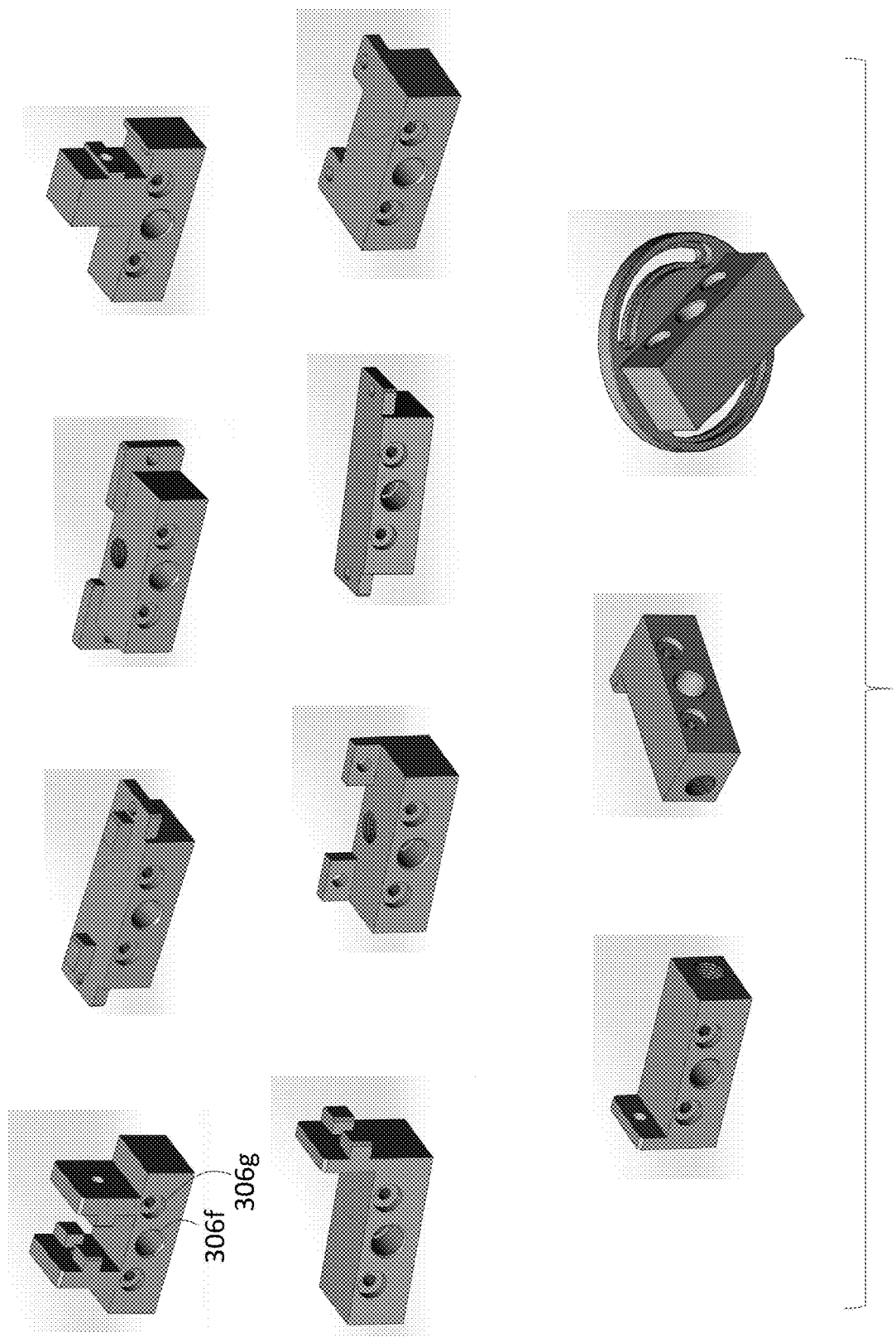
FIG. 21 is a set of schematic perspective views of a variety of field-assembly compatible mounting interfaces capable of adapting the modular interface to different mountings, including direct mounting to custom mounts and to T-slot or V-slot extruded rail systems.

FIG. 21 is a set of schematic perspective views of a variety of field-assembly compatible mounting interfaces capable of adapting the modular interface to different mountings, including direct mounting to custom mounts and to T-slot or V-slot extruded rail systems. As shown, the use of components designed to interface with T-slot or V-slot extrusions (e.g., 20 mm "80/20") extrusions allows for easy adjustment of finger positions.

As discussed herein, a palm is positionable adjacent the article to be gripped and provides an inner space toward which fingers may flex or curl, and a hub provides a substantially central node for connecting fingers, a palm, and/or air paths. In cases where these functions are shared by a structure or assembly, either word may be appropriate.

Figure 22:
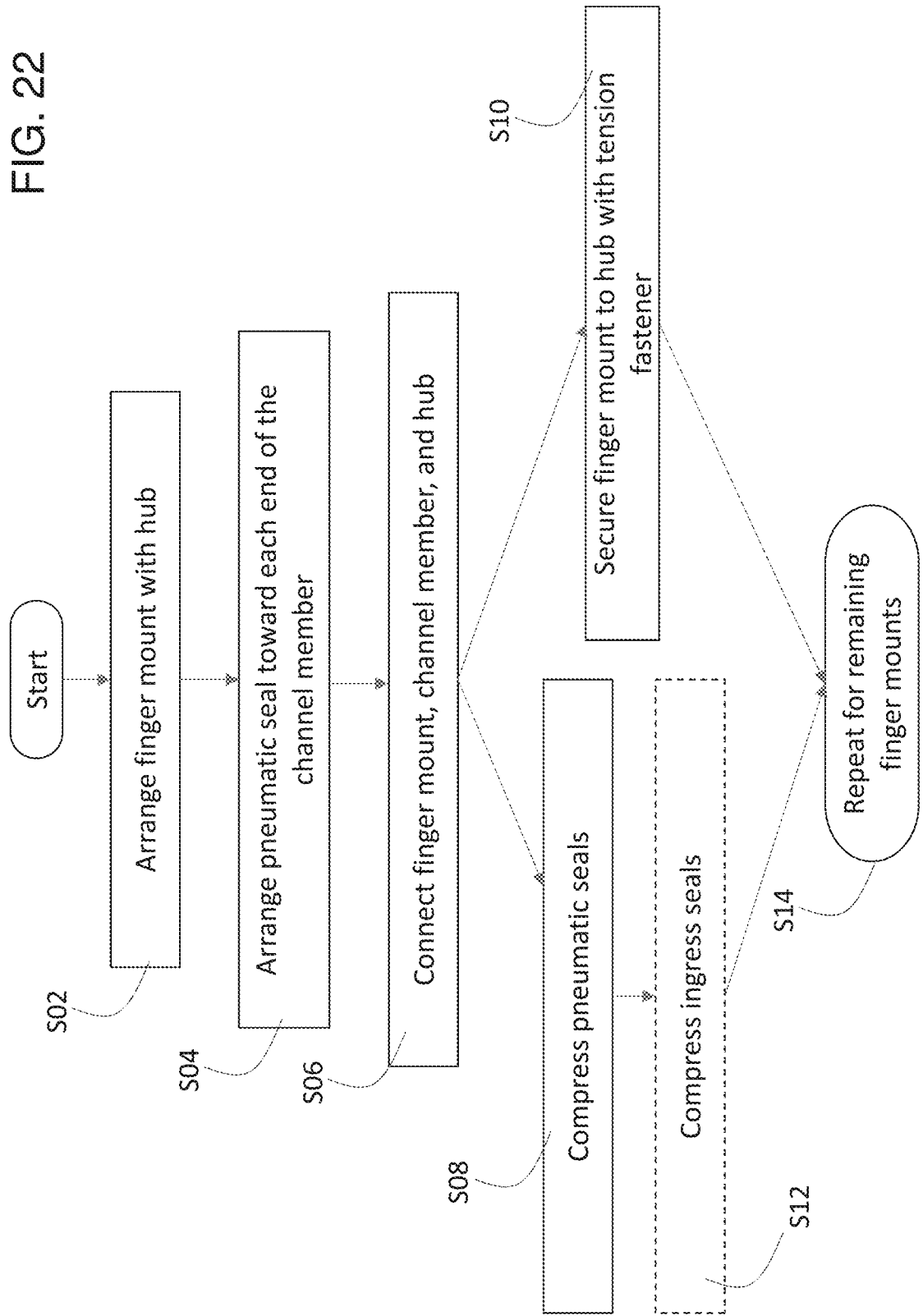
FIG. 22 includes a flowchart describing an assembly method for the grippers discussed herein, for assembling a soft robotic gripper to provide adaptive gripping of a product.

FIG. 22 includes a flowchart describing an assembly method for the grippers (EOAT) discussed herein, for assembling a soft robotic gripper to provide adaptive gripping of a product. As shown in FIG. 22, in step S02, a finger mount 310 is arranged including a passage 380 capable of connecting to the fluid port together with a hub 306, 304, 304/306 having a pneumatic inlet formed therethrough leading to a plurality of outlets 316. The passage 380 of the finger mount 310 may be connect with a respective outlet of the hub 306, 304, 304/306 via a channel member 303, 510 including a pneumatic channel 380, 380a. In step S04, a compressible pneumatic seal 404 may be arranged toward each end of the pneumatic channel 380a and/or channel member 501, 303. In step S06, the finger mount 310, channel member 501, 303, and hub 306, 304, 304/306 may be connected. The finger mount 310 may be secured to the hub 306, 304, 304/306 in compression using a tension fastener 322, 323 in step S10 to seal the pneumatic channel 380, 380a with both pneumatic seals under compression in step S08 (e.g., axial or radial compression). As shown, in FIG. 22, the compression step S08 and fastening/securing step S10 may take place substantially simultaneously. Optionally, in steps subsequent to FIG. 22, the hub 306, 304, 304/306 may be mounted to the terminus of a robotic arm 206, and the inflatable fingers 100 may be pneumatically actuated via the pneumatic channels/passages 380, 380a to bend under inflation in a first direction and under vacuum in a second direction.

Optionally, as indicated in FIG. 22 by a dashed line in step S12, microbial ingress seals 402 may be inserted surrounding (e.g., having a larger diameter than, and along a parallel plane to) one of the two pneumatic seals 404, at each interface where an outer surface of the hub 306, 304, 304/306 meets an outer surface of each respective finger mount 310. The microbial ingress seals 402 may be compressed (e.g., axially, and/or within an accepting groove 402a) between the hub 306, 304, 304/306 and each finger mount 310, optionally via the tension fastener 322, 323.

If the channel member includes a cylindrical tube, such as coupling 501, in step S08 one of the pneumatic seals 404, 404a may be compressed (e.g., radially) between an outer cylindrical wall of the tube 501 and an inner cylindrical wall of a receiving receptacle 310f in the finger mount 310. The remaining one of the pneumatic seals 404, 404a may be compressed (e.g., radially) between an outer cylindrical wall of the tube 501 and an inner cylindrical wall of a receiving receptacle 306f in the hub 306, 304, 304/306.

Optionally, in step S08 and/or step S12, the tension fastener 322, 323 may be passed through a respective pneumatic passage 380, 380a of the finger mount 310 and an outlet or passage 316 of the hub 306, 304, 304/306. In a case where the channel member includes a spacer 303, in step S08, S10, and/or step S12, tension fasteners 322, 323 may be passed through the channel 380, 380a to secure a respective finger mount 310 to the hub 306, 304, 304/306 via the at least one spacer 303.

Figure 23:
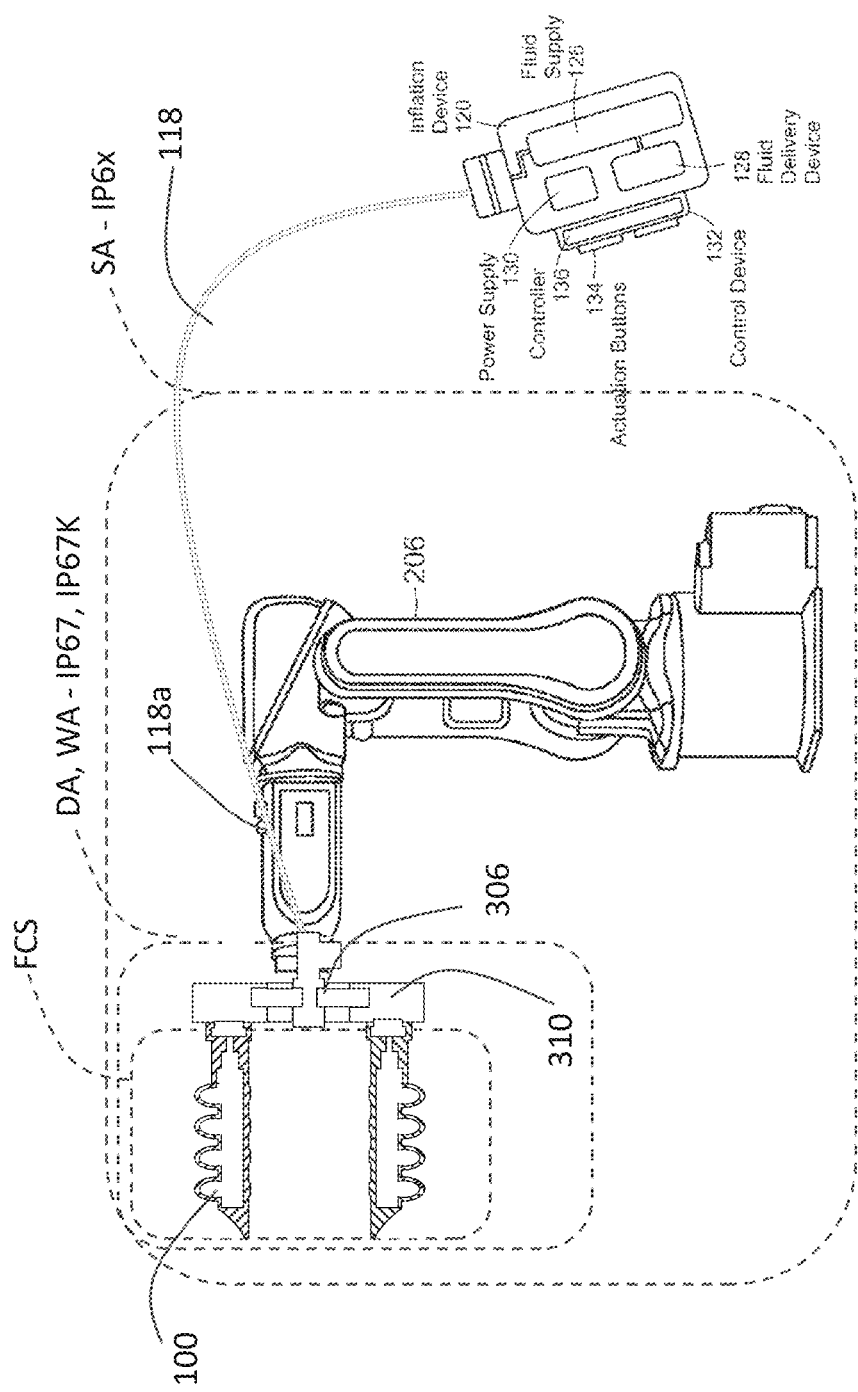
FIG. 23 shows a schematic view of the gripper solutions discussed herein together with a robot arm 206, similar to FIG. 2C, although fluid routing for the gripper fingers 100 is now internal to the gripper.

FIG. 23 shows a schematic view of the gripper solutions discussed herein together with a robot arm 206, similar to FIG. 2C, although fluid routing for the gripper fingers 100 is now internal to the gripper.

As shown in FIG. 23, an assembled gripper may be secured to an industrial or collaborative robot (e.g., robotic arm). An inflation device 120 may include a fluid supply 126, and a fluid delivery device 128, such as a pump or compressor, for supplying inflation fluid from the fluid supply 126 to the actuator 100 through the flexible tubing 118. The fluid delivery device 128 may be capable of supplying fluid to the actuator 100 or withdrawing the fluid from the actuator 100. The fluid delivery device 128 may be powered by electricity.

The power supply 130 may also supply power to a control device 132. The control device 132 may allow a user or programmed routine to control the inflation or deflation of the actuator, e.g. through one or more actuation buttons 134 (or alternative devices, such as a switch), or via executable code stored in memory or otherwise transmitted to or made accessible by controller 136. The control device 132 may include the controller 136 for sending a control signal to the fluid delivery device 128 to cause the fluid delivery device 128 to supply inflation fluid to, or withdraw inflation fluid from, the actuator 100.

Certain Definitions

End effector: may be the device at the end of a robotic arm, designed to interact with the environment, and/or may be the last link (or endpoint) of the robot. At an endpoint, tools may be attached; or, the end effector may itself act as a tool. An end effector may include one or both of a gripper or a tool.

Gripper: an end of arm gripper tends to hold, lift, transport and/or manipulate objects.

Tool: An end of arm tool may change a characteristic of the work object rather than gripping or holding it. Tool functions may include welding or fusing, spraying, dispensing, milling, screw or nut driving, flattening, cutting, and combinations of these.

Impactive end effector: grasping a work object by direct impact, including holding friction, e.g., jaws, claws, grippers.

Ingressive end effector: penetrating the work object, e.g., with needles, pins, or hackles.

Astrictive end effector: holding a work object by essentially attractive or field forces, e.g., such as Bernoulli lift, suction force, vacuum force, magnetic, electrostatic, van der Waals', ultrasonic standing waves, laser tweezing.

Contigutive holding a work object by essentially adhesive forces, e.g., via capillary action, glue, surface tension, freezing, chemical reaction.

Soft robotic gripper members may be formed of elastomeric materials, such as rubber, and/or thin walls of plastic arranged in an accordion structure that is configured to unfold, stretch, and/or bend under pressure, or other suitable relatively soft materials. Soft robotic gripper members may include a channel and/or hollow interior that can be filled with a fluid, such as air, water, or saline to pressurize, inflate, and/or actuate the gripper member. Upon actuation, the shape or profile of the gripper member changes by, e.g., variably curving, curling, including in opposing directions, or straightening. Alternatively or in addition, the gripper member may be actuated using a vacuum to remove inflation fluid from the gripper member and thereby change the degree to which the gripper member bends, twists, and/or extends.

Actuation may also allow the gripper member(s) to exert a force on a workpiece, such as a workpiece being grasped or pushed, as well as partially or fully conforming to the shape of the workpiece being grasped. Soft robotic gripper members can also harmlessly deflect upon collision with workpieces or the work environment.

General Notes on Terminology

"In one embodiment", "in an embodiment", "in some examples" or the like means "in at least one embodiment", not necessarily all referring to the same embodiment, and usable together in any combination in various embodiments. This description should not to be interpreted as reflecting an intention that the claimed embodiments require more features than are expressly recited in each claim. Rather, as the following claims reflect, inventive subject matter lies in less than all features of a single disclosed embodiment.

With reference to food product contact and ingress protection, reference is made to the following websites, which are herein incorporated by reference in their entireties:

https://automation-insights.blog/2018/03/07/hygienic-vs-washdown/ https://www.meatinstitute.org/index.php?ht=a/GetDocumentAction/i/97261

What is claimed is:

1. A soft robotic gripper comprising:
a hub configured to mount to a robotic arm, the hub having an inlet formed therethrough leading to an outlet;
an actuator mount assembly pneumatically coupled to the outlet, the actuator mount assembly comprising:
an inflatable actuator comprising an elastomer body and a fluid port configured to provide an inflation fluid,
an actuator mount including a passage configured to connect to the fluid port,
a channel member including a channel configured to connect the passage and the outlet,
a seal configured to surround at least a part of the channel of the channel member, and
a fastener configured to secure the actuator mount to the hub by sealing the channel with the seal under compression; and
a palm configured to form a plenum chamber between the outlet of the hub and the palm, the palm comprising a manifold of channels, wherein the passage of the actuator mount is configured to couple a respective channel of the palm to the inflatable finger.

2. The soft robotic gripper of claim 1, further comprising an anchor adjacent to the outlet.

3. The soft robotic gripper of claim 2, wherein the fastener is configured to secure the actuator mount to the palm through the passage and the plenum chamber and to be fastened to the anchor.

4. The soft robotic gripper of claim 2, wherein the anchor comprises a tapped hole formed in the hub, and the fastener comprises an elongated member having machine screw threads configured to mate to the tapped hole.

5. The soft robotic gripper of claim 1, wherein the palm is matched to an actuator mount via an interface matching the channel to the passage.

6. The soft robotic gripper of claim 5, further comprising a spacer that includes the interface.

7. The soft robotic gripper of claim 6, wherein the fastener passes through the interface to secure the actuator mount to the palm via the spacer.

8. The soft robotic gripper of claim 1, wherein the seal configured to be compressed between the palm and the actuator mount.

9. The soft robotic gripper of claim 1, wherein the hub is an upper hub, and further comprising a lower hub that includes the outlet, and the palm is configured to be compressed between the upper hub and the lower hub.

10. The soft robotic gripper of claim 9, further comprising a first ingress seal compressed between the upper hub and the palm and a second ingress seal compressed between the lower hub and the palm.

11. The soft robotic gripper of claim 9, further comprising a second seal configured to surround the upper hub and the lower hub.

12. The soft robotic gripper of claim 1, wherein the palm has a volumetric mass density less than one-half that of the hub.

13. The soft robotic gripper of claim 1, further comprising a microbial ingress seal configured to surround the seal at an interface where an outer surface of the hub meets an outer surface of the actuator mount, compressed between the hub and the actuator mount.

14. The soft robotic gripper of claim 1, wherein the actuator comprises:
a product contact area that is substantially as smooth or smoother than a 32 microinch average roughness (Ra), and
a non product contact area that is substantially as smooth or smoother than approximately 125 microinch (Ra).

15. The soft robotic gripper of claim 1, wherein the channel member includes a cylindrical tube, and the seal is compressed between an outer cylindrical wall of the tube and an inner cylindrical wall of a receiving receptacle in the actuator mount, or is compressed between an outer cylindrical wall of the tube and an inner cylindrical wall of a receiving receptacle in the hub.

16. The soft robotic gripper of claim 15, wherein the fastener passes through a respective pilot protrusion of the actuator mount and a pilot receptacle of the hub and is fastened under tension from the actuator mount and in a direction of the hub.

17. The soft robotic gripper of claim 1, wherein the fastener passes through the passage of the actuator mount and the outlet of the hub, and is fastened under tension from the actuator mount and in a direction of the hub.

18. The soft robotic gripper of claim 1, wherein the hub is matched to the actuator mount via a common mechanical interface matching the outlet to the passage, and the channel member comprises a spacer having an interface bridging between the outlet and the passage, the fastener passing through the interface to secure the actuator mount to the hub via the spacer, the spacer compressed between the actuator mount and the hub.

19. The soft robotic gripper of claim 18, wherein the fastener is configured to secure a pair of actuator mounts to the hub by passing through respective pneumatic passages of the pair of actuator mounts and a pair of outlets of the hub, and fastening under tension from a first actuator mount to a second actuator mount, compressing the hub between the first actuator mount and the second actuator mount.

20. A method for sealing a soft robotic gripper comprising:
   accessing a soft robotic gripper according to claim 1; and
   securing the actuator mount to the hub in compression using the fastener to seal the pneumatic channel with the seal under compression.

\* \* \* \* \*